United States Patent
Del Maschio et al.

(10) Patent No.: US 12,553,173 B2
(45) Date of Patent: Feb. 17, 2026

(54) APPLIANCE WITH RELIABLE INFORMATION OF A DRYING CYCLE

(71) Applicant: Electrolux Appliances Aktiebolag, Stockholm (SE)

(72) Inventors: Federico Del Maschio, Porcia (IT); Giorgio Pattarello, Porcia (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 499 days.

(21) Appl. No.: 18/133,737

(22) Filed: Apr. 12, 2023

(65) Prior Publication Data

US 2023/0243085 A1 Aug. 3, 2023

Related U.S. Application Data

(63) Continuation of application No. 16/472,996, filed as application No. PCT/EP2016/082749 on Dec. 28, 2016, now Pat. No. 11,686,041.

(51) Int. Cl.
*D06F 58/38* (2020.01)
*D06F 25/00* (2006.01)
(Continued)

(52) U.S. Cl.
CPC .............. *D06F 58/38* (2020.02); *D06F 25/00* (2013.01); *D06F 2103/04* (2020.02);
(Continued)

(58) Field of Classification Search
CPC .. D06F 58/38; D06F 2103/08; D06F 2103/38; D06F 2103/04; D06F 2103/10;
(Continued)

(56) References Cited

U.S. PATENT DOCUMENTS 4,215,486 A * 8/1980 Heyer ..................... D06F 34/08
219/509
4,275,508 A * 6/1981 Jones ................. G05D 23/1904
340/595
(Continued)

FOREIGN PATENT DOCUMENTS

CN 1888270 A 1/2007
CN 104074035 A 10/2014
(Continued)

OTHER PUBLICATIONS

Chinese Office Action for Application No. 201880090611.6, dated Jun. 23, 2022, with translation, 12 pages.
(Continued)

*Primary Examiner* — Edelmira Bosques
*Assistant Examiner* — Bao D Nguyen
(74) *Attorney, Agent, or Firm* — Chrisman Gallo Tochtrop LLC

(57) ABSTRACT

An appliance having a drying chamber for performing a drying cycle, a capacitive sensing arrangement within the drying chamber and configured to generate an electric signal indicative of a degree of humidity of a load contained in the drying chamber, and a control unit arranged for carrying out at least one among: estimating a mass of the load; estimating a residual humidity of the load; estimating a residual time to the end of the drying cycle, and detecting an end of the drying cycle according to the electric signal.

20 Claims, 9 Drawing Sheets

(51) Int. Cl.
  *D06F 103/04* (2020.01)
  *D06F 103/08* (2020.01)
  *D06F 103/10* (2020.01)
  *D06F 103/38* (2020.01)
  *D06F 105/12* (2020.01)
  *D06F 105/56* (2020.01)

(52) U.S. Cl.
  CPC ...... *D06F 2103/08* (2020.02); *D06F 2103/10* (2020.02); *D06F 2103/38* (2020.02); *D06F 2105/12* (2020.02); *D06F 2105/56* (2020.02)

(58) Field of Classification Search
  CPC .. D06F 2105/56; D06F 2105/12; D06F 25/00; G01N 27/223; G05D 22/02; G01D 5/24; G01D 5/2405; G01R 27/2605; F26B 25/00; F26B 21/08
  See application file for complete search history.

(56) References Cited

U.S. PATENT DOCUMENTS

| | | | | |
|---|---|---|---|---|
| 4,385,452 | A * | 5/1983 | Deschaaf | G05D 22/02 34/562 |
| 4,438,402 | A * | 3/1984 | Cullen | G01B 7/044 324/72 |
| 4,477,982 | A * | 10/1984 | Cotton | D06F 34/18 34/550 |
| 4,482,581 | A * | 11/1984 | Lorin | G01N 27/225 427/79 |
| 4,738,034 | A * | 4/1988 | Muramatsu | D06F 58/46 34/550 |
| 4,827,627 | A * | 5/1989 | Cardoso | D06F 58/38 34/526 |
| 4,965,698 | A * | 10/1990 | Thoma | G01M 3/16 29/25.42 |
| 5,228,212 | A * | 7/1993 | Turetta | D06F 58/30 34/493 |
| 5,649,372 | A * | 7/1997 | Souza | D06F 34/08 34/535 |
| 5,682,684 | A * | 11/1997 | Wentzlaff | D06F 58/38 34/524 |
| 5,757,181 | A * | 5/1998 | Wolf | F02D 41/2474 324/225 |
| 5,903,222 | A * | 5/1999 | Kawarizadeh | G01N 27/223 340/573.5 |
| 5,940,986 | A * | 8/1999 | Jelinek | D06F 58/04 34/528 |
| 6,079,121 | A * | 6/2000 | Khadkikar | D06F 34/26 34/531 |
| 6,784,673 | B2 | 8/2004 | Tomasi et al. | |
| 6,941,678 | B2 * | 9/2005 | Park | D06F 34/18 34/604 |
| 7,020,982 | B2 * | 4/2006 | Park | D06F 58/38 34/496 |
| 8,256,138 | B2 * | 9/2012 | Koo | D06F 34/18 34/550 |
| 8,683,714 | B2 * | 4/2014 | Cinar | D06F 58/22 34/550 |
| 9,200,402 | B2 * | 12/2015 | Wisherd | F26B 3/343 |
| 9,435,070 | B2 * | 9/2016 | Bae | D06F 34/18 |
| 9,447,537 | B2 * | 9/2016 | Wisherd | F26B 3/343 |
| 9,567,704 | B2 * | 2/2017 | Ros | D06F 58/22 |
| 9,605,899 | B2 * | 3/2017 | Herman | F26B 3/347 |
| 2003/0235993 | A1 * | 12/2003 | Leung | H01L 21/31116 257/E21.252 |
| 2004/0051540 | A1 * | 3/2004 | Tomasi | D06F 58/04 324/664 |
| 2004/0211083 | A1 * | 10/2004 | Park | D06F 34/18 34/528 |
| 2009/0126220 | A1 * | 5/2009 | Nawrot | D06F 58/50 34/526 |
| 2011/0041260 | A1 * | 2/2011 | Balinski | D06F 39/04 8/159 |
| 2011/0041562 | A1 * | 2/2011 | Balinski | D06F 33/43 34/486 |
| 2012/0110869 | A1 | 5/2012 | Bellinger et al. | |
| 2013/0119055 | A1 * | 5/2013 | Wohl | H05B 6/62 219/774 |
| 2013/0326904 | A1 | 12/2013 | Altinier et al. | |
| 2014/0020262 | A1 * | 1/2014 | Altinier | D06F 58/38 34/499 |
| 2014/0152519 | A1 * | 6/2014 | Buyuk-Kalender | G06K 19/07749 343/749 |
| 2014/0325865 | A1 * | 11/2014 | Wisherd | D06F 58/266 34/255 |
| 2015/0101207 | A1 * | 4/2015 | Herman | D06F 58/04 34/255 |
| 2015/0124416 | A1 * | 5/2015 | Lin | H01L 24/20 361/761 |
| 2015/0153104 | A1 * | 6/2015 | Bae | D06F 58/04 34/108 |
| 2015/0185176 | A1 * | 7/2015 | Koo | G01N 27/223 427/79 |
| 2016/0053428 | A1 * | 2/2016 | Ros | D06F 58/22 34/82 |
| 2016/0130743 | A1 * | 5/2016 | Wisherd | F26B 3/343 34/132 |
| 2016/0222576 | A1 * | 8/2016 | Yoo | D06F 58/38 |

FOREIGN PATENT DOCUMENTS

| | | |
|---|---|---|
| CN | 105247131 A | 1/2016 |
| DE | 19651883 C1 | 4/1998 |
| DE | 102009029621 A1 | 3/2011 |
| EP | 0967319 A1 | 12/1999 |
| EP | 1413664 A1 | 4/2004 |
| EP | 1612319 A1 | 1/2006 |
| EP | 2458075 A1 | 5/2012 |
| EP | 2601339 A2 | 6/2013 |
| EP | 2927365 A1 | 10/2015 |
| EP | 2927366 A1 | 10/2015 |
| EP | 3124676 A1 | 2/2017 |
| EP | 3162952 A1 | 5/2017 |
| JP | 05115688 A | 5/1994 |
| WO | 2006040781 A2 | 4/2006 |
| WO | 2012016820 A2 | 2/2012 |
| WO | 2016015765 A1 | 2/2016 |
| WO | 2016091717 A1 | 6/2016 |

OTHER PUBLICATIONS

European Communication pursuant to Article 94(3) for European Application No. 16 822 204.0, dated Mar. 21, 2022, 5 pages.
International Search Report and Written Opinion for International Application No. PCT/EP2016/075190, dated Jan. 2, 2017, 8 pages.
International Search Report and Written Opinion for International Application No. PCT/EP2016/082747, dated Sep. 12, 2017, 11 pages.
International Search Report and Written Opinion for International Application No. PCT/EP2016/082749, dated Mar. 13, 2017, 11 pages.
International Search Report and Written Opinion for International Application No. PCT/EP2018/055681, dated Nov. 22, 2018, 12 pages.
Non Final Office Action for U.S. Appl. No. 16/472,506, mailed Feb. 23, 2021, 24 pages.
Non Final Office Action for U.S. Appl. No. 16/860,488, mailed Sep. 29, 2021, 30 pages.
Notice of Allowance for U.S. Appl. No. 16/472,506, dated Jun. 18, 2021, 8 pages.
Entire patent prosecution history of U.S. Appl. No. 16/472,996, filed Jun. 24, 2019, entitled, "Appliance With Reliable Information of a Drying Cycle."

* cited by examiner

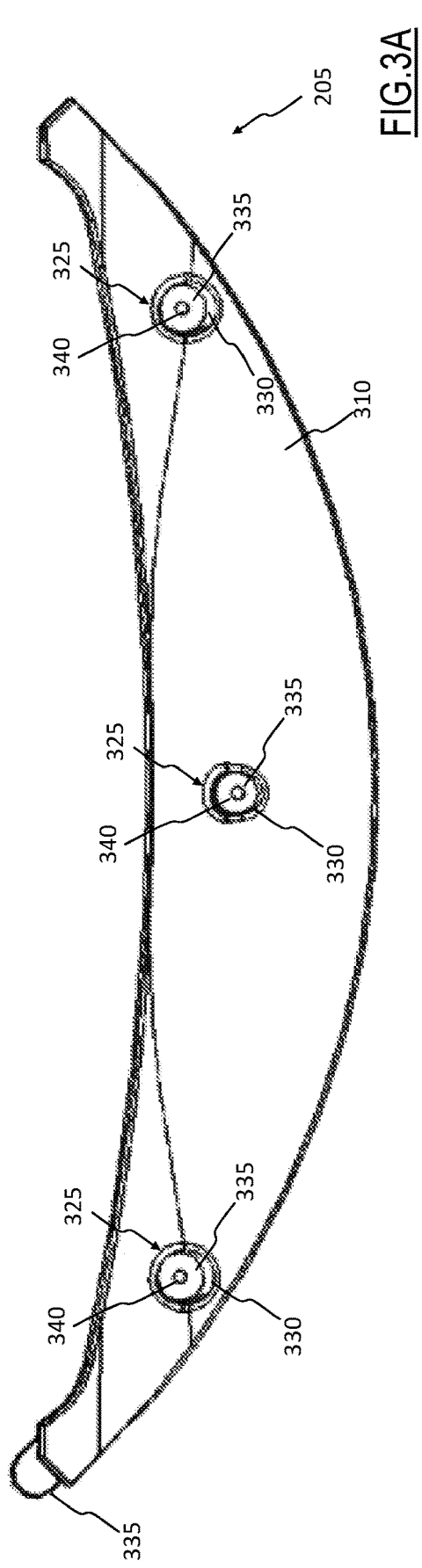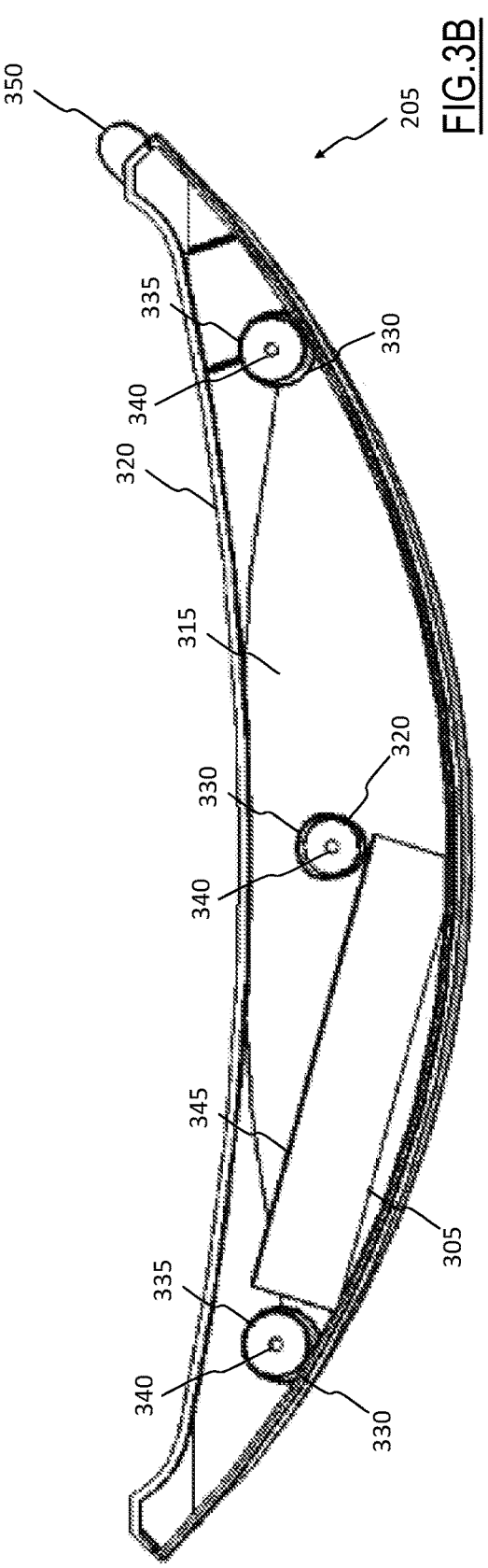

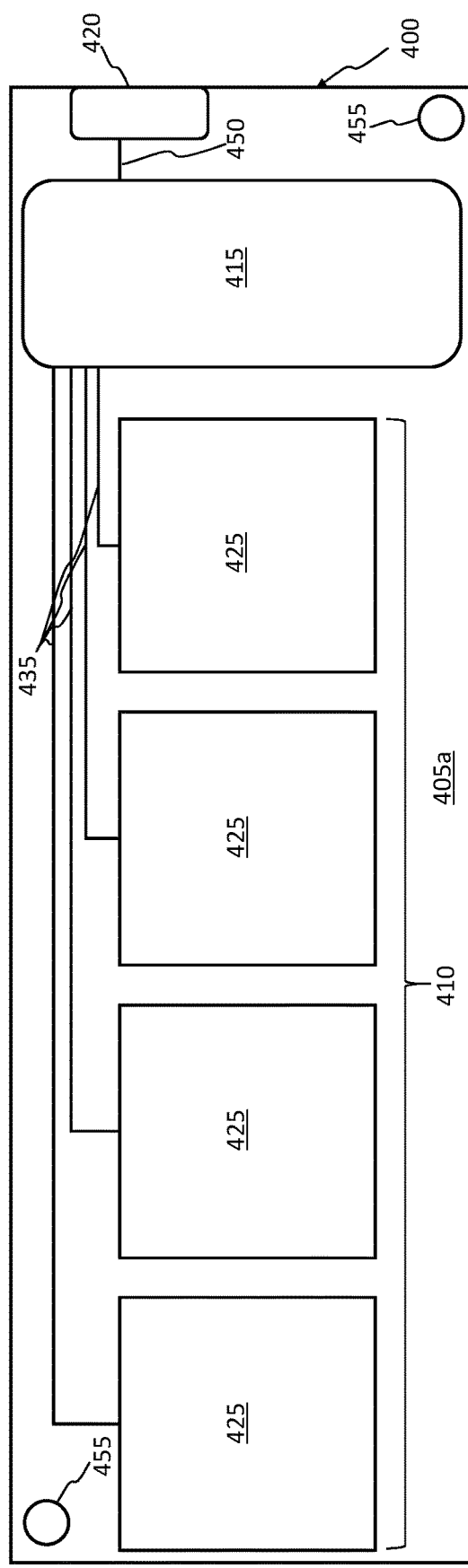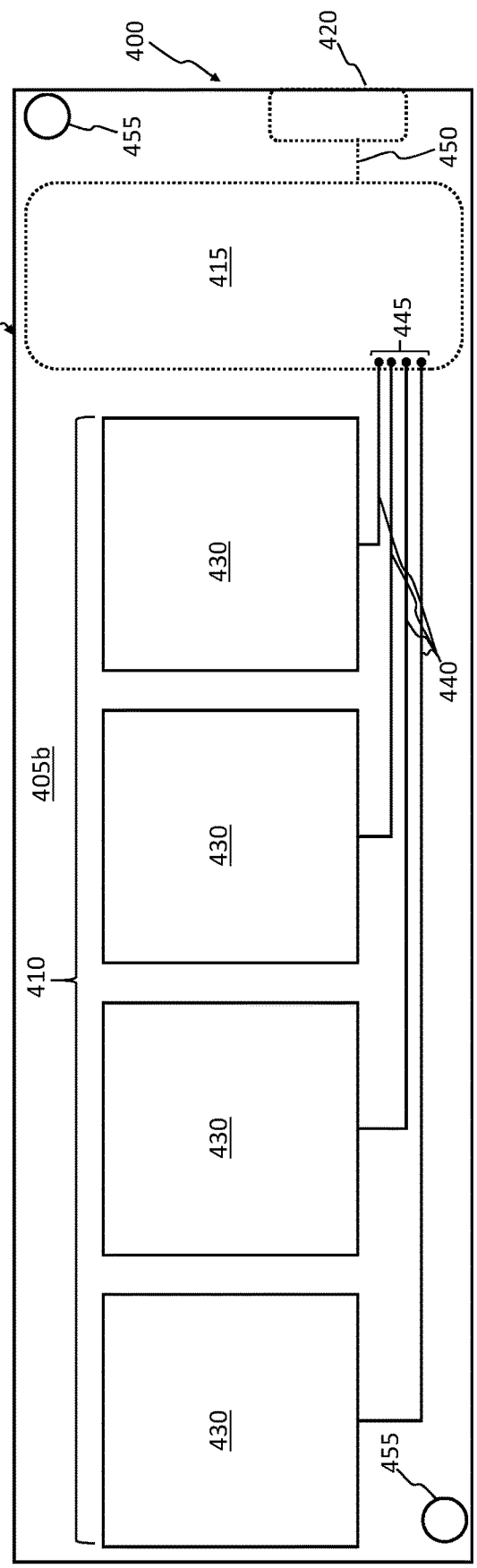

APPLIANCE WITH RELIABLE INFORMATION OF A DRYING CYCLE

This application is a continuation of U.S. patent application Ser. No. 16/472,996, filed Jun. 24, 2019 which is a U.S. National Phase application of PCT International Application No. PCT/EP2016/082749, filed Dec. 28, 2016, both of which are incorporated herein by reference in their entireties.

FIELD OF THE INVENTION

The present invention generally relates to an appliance able to perform drying cycles, such as a laundry drying, laundry washing/drying, and dishwashing appliance, both for domestic and professional use. More particularly, the present invention relates to an appliance comprising an improved humidity sensor for sensing the humidity of a load to be dried and/or under drying, and arranged for providing reliable drying information based on the humidity sensed by such a humidity sensor.

BACKGROUND OF THE INVENTION

Reliable drying information is one of the features that any customer demand from his/her appliance.

Drying information may typically comprise an estimation of a mass of the load (hereinafter, load mass estimation), and/or an estimation of a residual humidity of the load (hereinafter, residual humidity estimation), and/or an estimation of a residual time to the end of the drying cycle (hereinafter, residual time-to-end estimation), and/or a detection of an end of the drying cycle (hereinafter, end cycle detection).

Considering for example a tumble dryer, having reliable drying information is a tough task, due to the unpredictable randomness of the drying process. For example, for the same laundry load and for the same initial wetting level thereof, the drying cycle duration can significantly vary depending on unpredictable factors, such as clothes wrapping in the drum.

Drying information is usually provided according to drying cycle assumptions in turn based on "case of" policies, or by carrying out measurements upon occurrence of some predetermined drying cycle conditions or events, or it may be inferred by using proper signals (such as signals indicative of the motor torque, hereinafter motor torque signals, or signals indicative of a temperature within the appliance, hereinafter temperature signals).

SUMMARY OF INVENTION

The Applicant has realized that the known solutions for providing drying information are not reliable.

Indeed, the Applicant has understood that the solutions based on drying cycle assumptions provide unreliable drying information, as they do not take into account the actual conditions of the appliance and of the load to be dried.

The Applicant has also understood that the solutions based on measurements carried out upon occurrence of some predetermined drying cycle conditions or events practically fail in providing reliable drying information, in that the drying cycle conditions usually have a low and/or inconstant correlation with the drying information.

The applicant has further understood that the solutions based on inferring the drying information by using signals, such as motor torque signals or temperature signals, are not satisfactory. Indeed, such signals are provided by sensing devices, which are inherently affected by a multiplicity of biases and noises. Moreover, the sensing devices are strongly affected by appliance operation, and may suffer from signal saturations or low sensibility.

Considering for example a temperature sensor providing the temperature signals, the temperature sensor features long dynamics (i.e., long response time, due to thermal inertia), thus no quick information can be provided. Moreover, the temperature sensor measurement dynamics is strictly related and sensible to the nature of the drying air flow of the appliance and its dynamics. On the other hand, motor torque signals feature strong appliance-to-appliance variations, mainly due to flexible belts and variations in drum sealing.

The Applicant has also recognized that, in general, all the above solutions fail in providing reliable drying information in that no accurate load humidity can be detected.

In view of the above, it is an object of the present invention to provide an appliance having an improved humidity sensor for sensing the load humidity, and arranged for providing drying information (comprising at least one among load mass estimation, residual humidity estimation, residual time-to-end estimation, and end cycle detection) based thereon.

One or more aspects of the present invention are set out in the independent claims, with advantageous features of the same invention that are indicated in the dependent claims.

An aspect of the present invention relates to an appliance comprising:
  a drying chamber for performing a drying cycle,
  within the drying chamber, a capacitive sensing arrangement arranged for generating an electric signal indicative of a degree of humidity of a load contained in the drying chamber, and
  a control unit arranged for carrying out at least one among:
    estimating a mass of the load;
    estimating a residual humidity of the load;
    estimating a residual time to the end of the drying cycle, and
    detecting an end of the drying cycle
  according to the electric signal.

According to an embodiment, said capacitive sensing arrangement comprises at least one electrically conductive pad on an operating support, each electrically conductive pad being preferably adapted to operate as a respective plate of a capacitor.

According to an embodiment, a bottom portion of an appliance cabinet that faces the floor comprises one or more supporting pins or feet.

According to an embodiment, at least one of said supporting feet is a vertically adjustable supporting foot.

According to an embodiment, a power cord exits from a rear side of an appliance cabinet opposite a front panel, and serves for powering the appliance when connected to power mains.

According to an embodiment, the appliance comprises a drum rotatably supported on one or more rollers.

According to an embodiment, said estimating a residual humidity of the load comprises:
  determining, from said electric signal, at least one operating signal among:
    an operating signal indicative of an average value of the electric signal;
    an operating signal indicative of an oscillation of the electric signal around the average value thereof;

an operating signal indicative of a behavior of the electric signal above a first threshold value higher than the average value;

an operating signal indicative of a behavior of the electric signal below a second threshold value lower than average value, an operating signal indicative of a minimum of the electric signal, and estimating a residual humidity of the load according to said at least one operating signal.

According to an embodiment, said estimating a residual humidity of the load comprises applying a linear regression model to said at least one operating signal.

According to an embodiment, said estimating a residual humidity of the load is based on a linear combination of said at least one operating signal.

According to an embodiment, the control unit is further arranged for estimating a residual time to the end of the drying cycle according to said estimating a residual humidity of the load.

According to an embodiment, said estimating a residual time to the end of the drying cycle comprises:

iterating said determining and said estimating, each iteration being carried out at a respective time instant, and estimating the residual time to the end of the drying cycle according to an interpolation of the residual humidity estimated at a predefined number of iterations.

According to an embodiment, said applying a linear regression model to said at least one operating signal comprises, for each iteration, applying a linear regression model to the at least one operating signal determined at the time instant associated with that iteration.

According to an embodiment, for each iteration, said estimating a residual humidity of the load is based on a linear combination of the at least one operating signal determined at the time instant associated with that iteration.

According to an embodiment, the control unit is arranged for detecting the end of the drying cycle according to a comparison between the estimated residual humidity of the load and a predetermined humidity level indicative of the residual humidity desired for the load at the end of the drying cycle.

According to an embodiment, the predetermined humidity level is selectable by a user.

According to an embodiment, said estimating a residual time to the end of the drying cycle comprises, at an initial phase of the drying cycle:

determining at least one parameter of the electric signal during said initial phase, and estimating a residual time to the end of the drying cycle in said initial phase according to said at least one parameter, said estimating a residual humidity of the load and said estimating a residual time to the end of the drying cycle according to said estimating a residual humidity of the load being preferably performed after said initial phase.

According to an embodiment, the control unit is arranged for carrying out said estimating a residual time to the end of the drying cycle in an initial phase of the drying cycle according to at least one parameter of the electric signal determined during said initial phase, the control unit being preferably arranged for estimating a residual humidity of the load, and/or estimating a residual time to the end of the drying cycle, and/or detecting an end of the drying cycle after said initial phase.

According to an embodiment, said estimating a residual time to the end of the drying cycle in said initial phase comprises:

determining, for each parameter of the electric signal, a parameter regression function indicative of a correlation between that parameter of the electric signal and the degree of humidity of the load contained in the drying chamber, and performing a linear combination of each parameter applied to the respective parameter regression function.

According to an embodiment, at the initial phase of the drying cycle, the control unit is further arranged for estimating a mass of the load according to said at least one parameter of the electric signal.

According to an embodiment, the control unit is arranged for carrying out said estimating a mass of the load in an initial phase of the drying cycle according to at least one parameter of the electric signal determined during said initial phase, the control unit being preferably arranged for estimating a residual humidity of the load, and/or estimating a residual time to the end of the drying cycle, and/or detecting an end of the drying cycle after said initial phase.

According to an embodiment, said estimating a mass of the load according to said at least one parameter comprises determining, for each parameter of the electric signal, a parameter regression function indicative of a correlation between that parameter of the electric signal and the mass of the load, said estimating a mass of the load preferably comprising performing a linear combination of each parameter applied to the respective parameter regression function.

According to an embodiment, each operating signal in the linear combination is weighted by a respective coefficient, the coefficient of each operating signal being preferably calculated according to said estimating a mass of the load.

According to an embodiment, said at least one parameter of the electric signal comprise at least one among:

average value of the electric signal;

standard deviation of the electric signal;

percentage of samples of the electric signal above a further first threshold value higher than a minimum value of the electric signal, and percentage of samples of the electric signal below a further second threshold value lower than the minimum value of the electric signal.

According to an embodiment, said estimating a residual time to the end of the drying cycle according to said electric signal comprises:

determining at least one operating signal among:

an operating signal indicative of an average value of the electric signal;

an operating signal indicative of an oscillation of the electric signal around the average value thereof;

an operating signal indicative of a behavior of the electric signal above a first threshold value higher than the average value;

an operating signal indicative of a behavior of the electric signal below a second threshold value lower than average value, an operating signal indicative of a minimum of the electric signal, and estimating a residual time to the end of the drying cycle according to said at least one operating signal.

According to an embodiment, said estimating a residual time to the end of the drying cycle according to said at least one operating signal comprises:

determining at least one threshold value each one associated with a respective operating signal, such that when the at least one operating signal reaches the respective threshold value the end of the drying cycle is detected, monitoring a behavior of said at least one electric signal over time with respect to the associated threshold value, and estimating a residual time to the end of the drying cycle according to monitored behavior of said at least one operating signal.

According to an embodiment, said detecting an end of the drying cycle according to said electric signal comprises:

determining at least one operating signal among:

an operating signal indicative of an average value of the electric signal;

an operating signal indicative of an oscillation of the electric signal around the average value thereof;

an operating signal indicative of a behavior of the electric signal above a first threshold value higher than the average value;

an operating signal indicative of a behavior of the electric signal below a second threshold value lower than average value, an operating signal indicative of a minimum of the electric signal, and detecting an end of the drying cycle according to said electric signal according to said at least one operating signal.

According to an embodiment, said detecting an end of the drying cycle according to said at least one operating signal comprises:

determining at least one threshold value each one associated with a respective operating signal, and detecting the end of the drying cycle when the at least one operating signal reaches the respective threshold value.

According to an embodiment, the control unit is arranged for carrying out at least one among said estimating a mass of the load;

estimating a residual humidity of the load;

estimating a residual time to the end of the drying cycle, and detecting an end of the drying cycle according to a further electric signal, the further electric signal being preferably indicative of a temperature in the drying chamber.

Another aspect of the present invention relates to a method comprising carrying out at least one among:

estimating a mass of a load in a drying chamber of an appliance;

estimating a residual humidity of the load;

estimating a residual time to the end of a drying cycle, and detecting an end of a drying cycle according to an electric signal generated by a capacitive sensing arrangement arranged within the drying chamber and indicative of a degree of humidity of a load contained in the drying chamber.

According to an embodiment, said capacitive sensing arrangement comprises at least one electrically conductive pad on an operating support, each electrically conductive pad being preferably adapted to operate as a respective plate of a capacitor.

According to an embodiment, a bottom portion of an appliance cabinet that faces the floor comprises one or more supporting pins or feet.

According to an embodiment, at least one of said supporting feet is a vertically adjustable supporting foot.

According to an embodiment, a power cord exits from a rear side of an appliance cabinet opposite a front panel, and serves for powering the appliance when connected to power mains.

According to an embodiment, the appliance comprises a drum rotatably supported on one or more rollers.

According to an embodiment, said estimating a residual humidity of the load comprises:

determining, from said electric signal, at least one operating signal among:

an operating signal indicative of an average value of the electric signal;

an operating signal indicative of an oscillation of the electric signal around the average value thereof;

an operating signal indicative of a behavior of the electric signal above a first threshold value higher than the average value;

an operating signal indicative of a behavior of the electric signal below a second threshold value lower than average value, an operating signal indicative of a minimum of the electric signal, and estimating a residual humidity of the load according to said at least one operating signal.

According to an embodiment, said estimating a residual humidity of the load comprises applying a linear regression model to said at least one operating signal.

According to an embodiment, said estimating a residual humidity of the load is based on a linear combination of said at least one operating signal.

According to an embodiment, the method further comprises estimating a residual time to the end of the drying cycle according to said estimating a residual humidity of the load.

According to an embodiment, said estimating a residual time to the end of the drying cycle comprises:

iterating said determining and said estimating, each iteration being carried out at a respective time instant, and estimating the residual time to the end of the drying cycle according to an interpolation of the residual humidity estimated at a predefined number of iterations.

According to an embodiment, said applying a linear regression model to said at least one operating signal comprises, for each iteration, applying a linear regression model to the at least one operating signal determined at the time instant associated with that iteration.

According to an embodiment, for each iteration, said estimating a residual humidity of the load is based on a linear combination of the at least one operating signal determined at the time instant of associated with that iteration.

According to an embodiment, the method comprises detecting the end of the drying cycle according to a comparison between the estimated residual humidity of the load and a predetermined humidity level indicative of the residual humidity desired for the load at the end of the drying cycle.

According to an embodiment, the predetermined humidity level is selectable by a user.

According to an embodiment, said estimating a residual time to the end of the drying cycle comprises, at an initial phase of the drying cycle:

determining at least one parameter of the electric signal during said initial phase, and estimating a residual time to the end of the drying cycle in said initial phase according to said at least one parameter, said estimating a residual humidity of the load and said estimating a residual time to the end of the drying cycle according to said estimating a residual humidity of the load being preferably performed after said initial phase.

According to an embodiment, the method comprises carrying out said estimating a residual time to the end of the drying cycle in an initial phase of the drying cycle according to at least one parameter of the electric signal determined during said initial phase. Preferably, said estimating a residual humidity of the load, and/or said estimating a residual time to the end of the drying cycle, and/or said detecting an end of the drying cycle are carried out after said initial phase.

According to an embodiment, said estimating a residual time to the end of the drying cycle in said initial phase comprises:
  determining, for each parameter of the electric signal, a parameter regression function indicative of a correlation between that parameter of the electric signal and the degree of humidity of the load contained in the drying chamber, and
  performing a linear combination of each parameter applied to the respective parameter regression function.

According to an embodiment, the method comprises, at the initial phase of the drying cycle, estimating a mass of the load according to said at least one parameter of the electric signal.

According to an embodiment, the method comprises carrying out said estimating a mass of the load in an initial phase of the drying cycle according to at least one parameter of the electric signal determined during said initial phase, the method preferably comprising estimating a residual humidity of the load, and/or estimating a residual time to the end of the drying cycle, and/or detecting an end of the drying cycle after said initial phase.

According to an embodiment, said estimating a mass of the load according to said at least one parameter comprises determining, for each parameter of the electric signal, a parameter regression function indicative of a correlation between that parameter of the electric signal and the mass of the load, said estimating a mass of the load preferably comprising performing a linear combination of each parameter applied to the respective parameter regression function.

According to an embodiment, each operating signal in the linear combination is weighted by a respective coefficient, the coefficient of each operating signal being preferably calculated according to said estimating a mass of the load.

According to an embodiment, said at least one parameter of the electric signal comprise at least one among:
  average value of the electric signal;
  standard deviation of the electric signal;
  percentage of samples of the electric signal above a further first threshold value higher than a minimum value of the electric signal, and
  percentage of samples of the electric signal below a further second threshold value lower than the minimum value of the electric signal.

According to an embodiment, said estimating a residual time to the end of the drying cycle according to said electric signal comprises:
  determining at least one operating signal among:
    an operating signal indicative of an average value of the electric signal;
    an operating signal indicative of an oscillation of the electric signal around the average value thereof;
    an operating signal indicative of a behavior of the electric signal above a first threshold value higher than the average value;
    an operating signal indicative of a behavior of the electric signal below a second threshold value lower than average value,
    an operating signal indicative of a minimum of the electric signal, and
  estimating a residual time to the end of the drying cycle according to said at least one operating signal.

According to an embodiment, said estimating a residual time to the end of the drying cycle according to said at least one operating signal comprises:
  determining at least one threshold value each one associated with a respective operating signal, such that when the at least one operating signal reaches the respective threshold value the end of the drying cycle is detected,
  monitoring a behavior of said at least one electric signal over time with respect to the associated threshold value, and
  estimating a residual time to the end of the drying cycle according to monitored behavior of said at least one operating signal.

According to an embodiment, said detecting an end of the drying cycle according to said electric signal comprises:
  determining at least one operating signal among:
    an operating signal indicative of an average value of the electric signal;
    an operating signal indicative of an oscillation of the electric signal around the average value thereof;
    an operating signal indicative of a behavior of the electric signal above a first threshold value higher than the average value;
    an operating signal indicative of a behavior of the electric signal below a second threshold value lower than average value,
    an operating signal indicative of a minimum of the electric signal, and
  detecting an end of the drying cycle according to said electric signal according to said at least one operating signal.

According to an embodiment, said detecting an end of the drying cycle according to said at least one operating signal comprises:
  determining at least one threshold value each one associated with a respective operating signal, and
  detecting the end of the drying cycle when the at least one operating signal reaches the respective threshold value.

According to an embodiment, the control unit is arranged for carrying out at least one among said
  estimating a mass of the load;
  estimating a residual humidity of the load;
  estimating a residual time to the end of the drying cycle, and
  detecting an end of the drying cycle
according to a further electric signal, the further electric signal being preferably indicative of a temperature in the drying chamber.

BRIEF DESCRIPTION OF THE ANNEXED DRAWINGS

These and other features and advantages of the present invention will be made apparent by the following description of some exemplary and non-limitative embodiments thereof; for its better intelligibility, the following description should be read making reference to the attached drawings, wherein:

FIGS. 3A and 3B are front and rear perspective views of a cover plate of the front panel which is adapted to house a humidity sensor according to an embodiment of the invention;

FIGS. 4A and 4B are front and rear plane views of the humidity sensor according to an embodiment of the invention;

Figure 5:
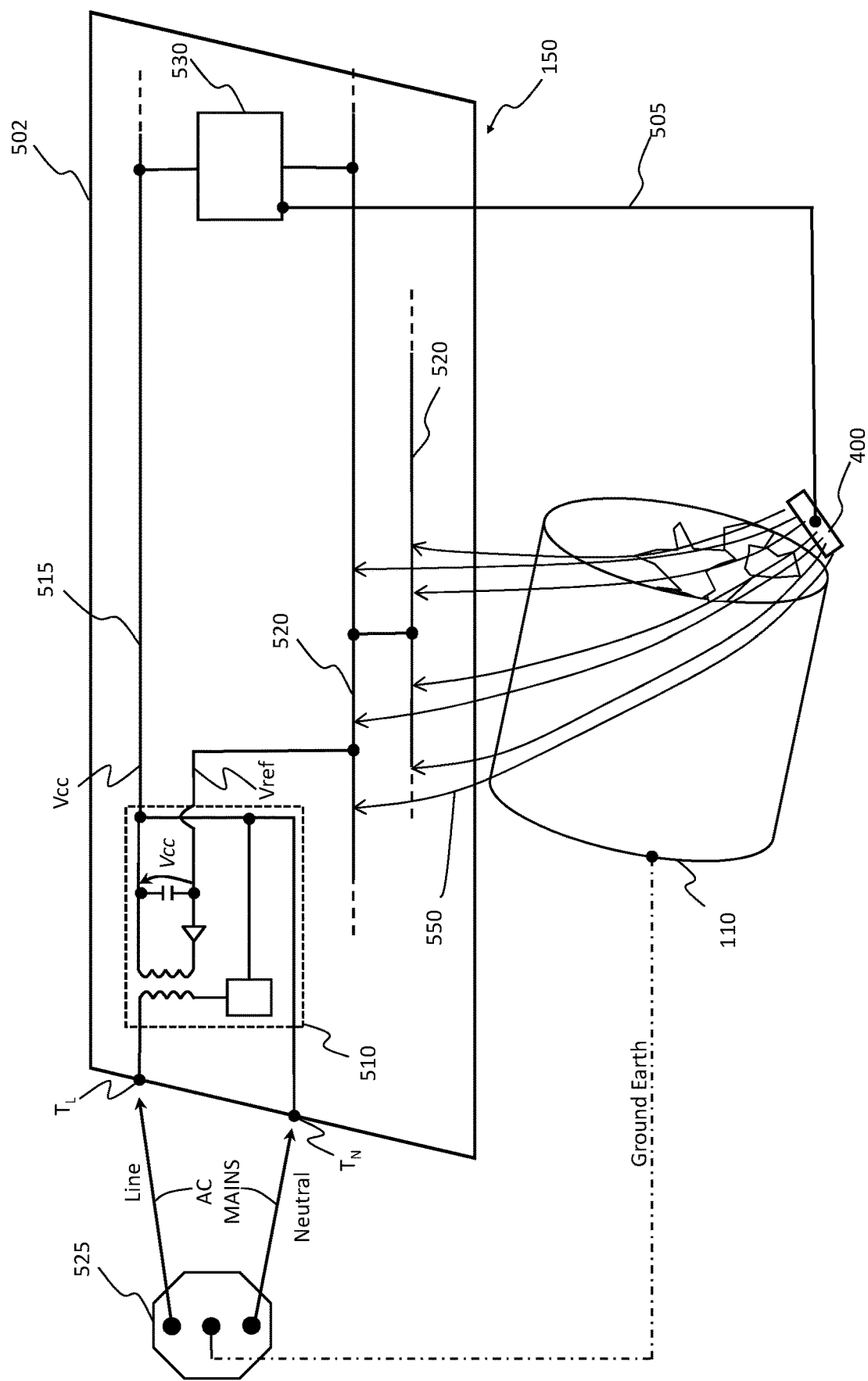
Figure 6:
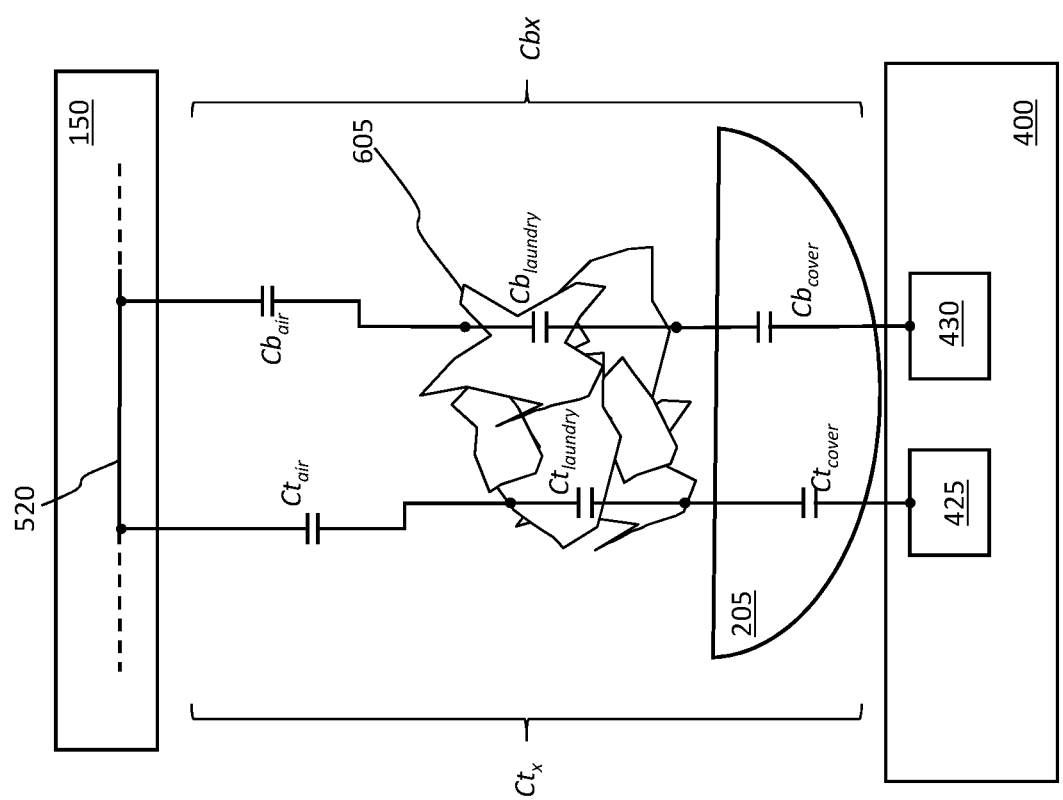
Figure 7:
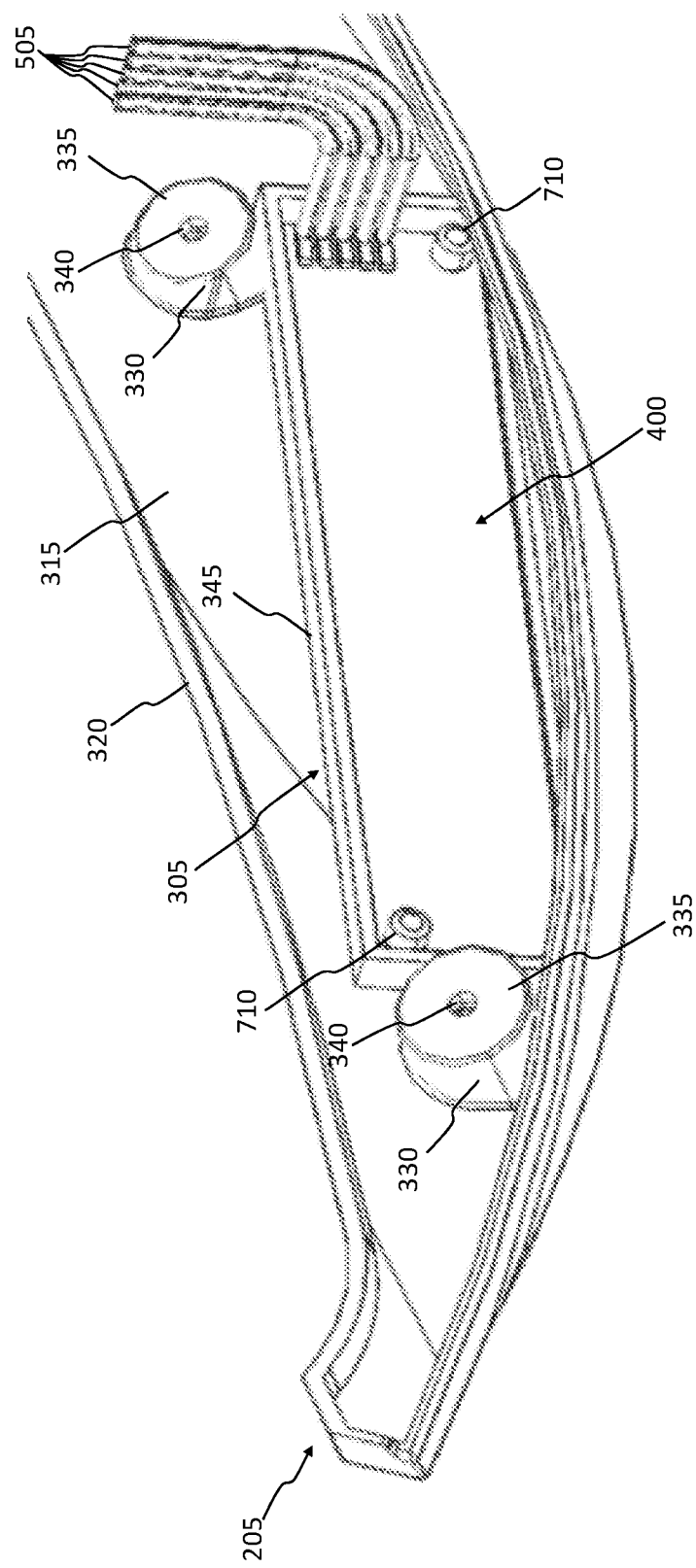
Figure 8:
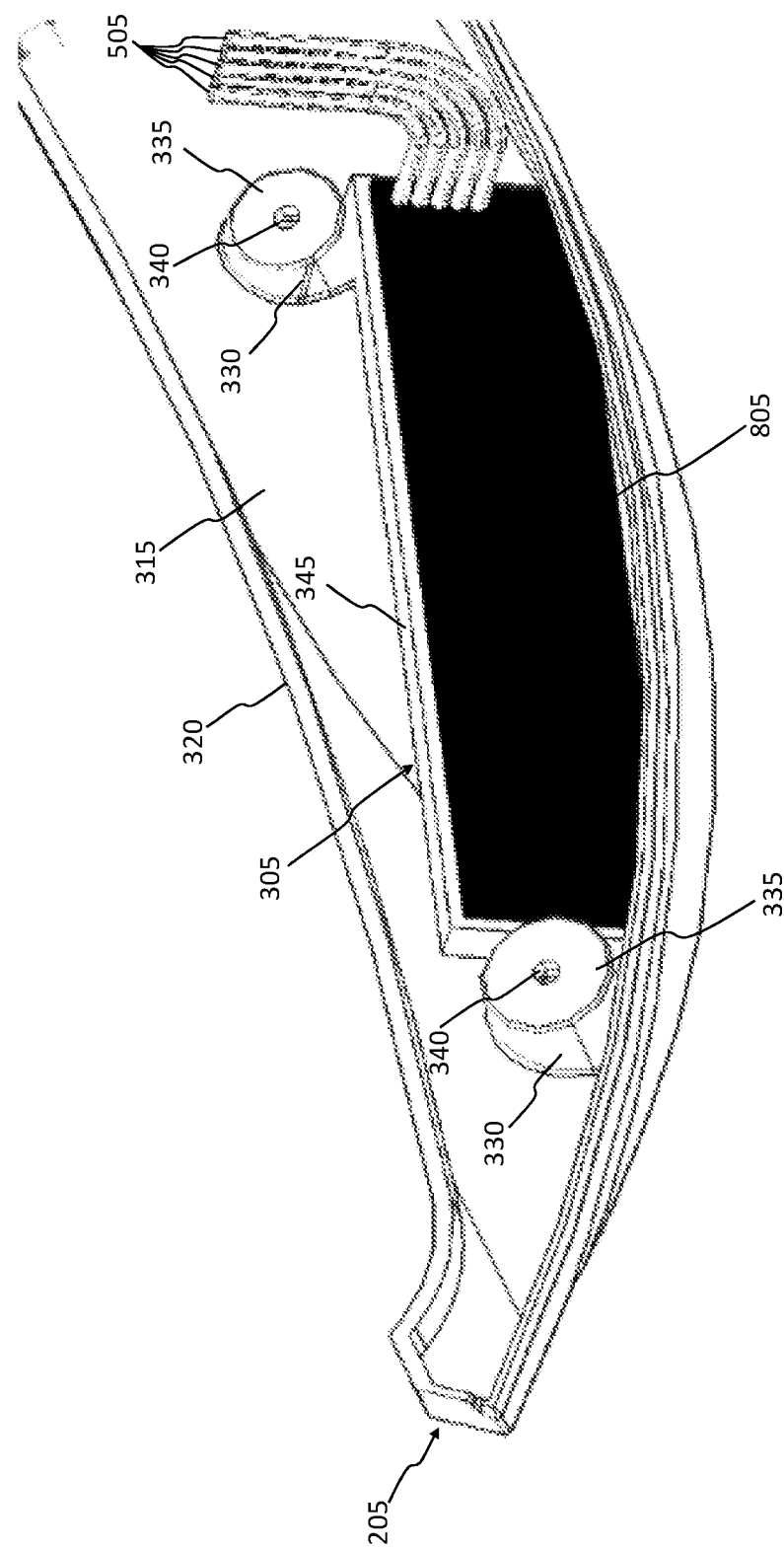
Figure 9:
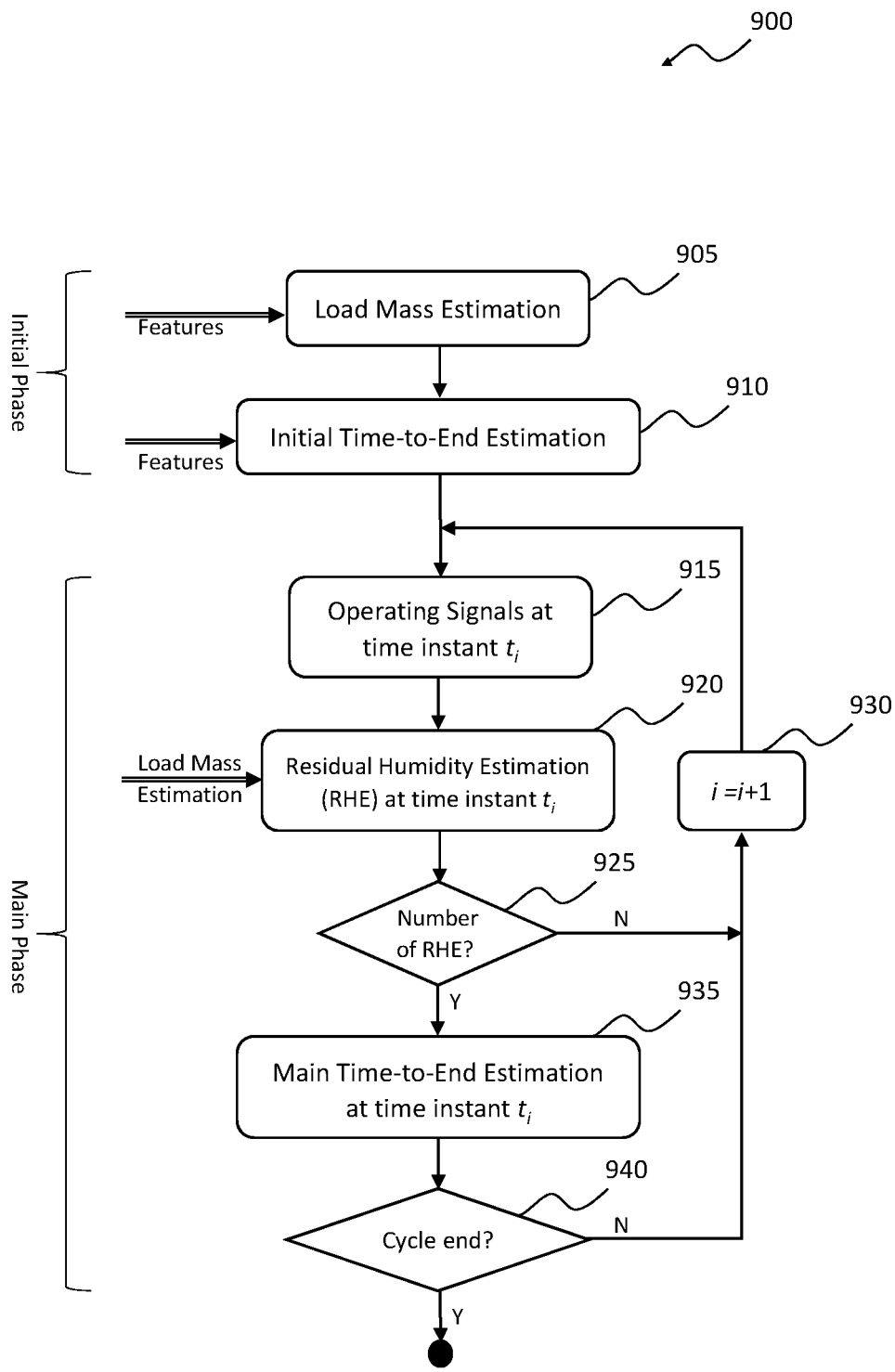

FIG. 5 schematically shows, partly in terms of functional blocks, a system for measuring the humidity degree of the laundry mass to be dried according to an embodiment of the present invention;

FIG. 6 schematizes capacitance components comprised in a total capacitance measured by the system for measuring the humidity degree according to an embodiment of the present invention;

FIG. 7 is a perspective detail view of the cover plate of FIGS. 3A and 3B housing the humidity sensor of FIGS. 4A and 4B;

FIG. 8 is a perspective detail view of the cover plate of FIGS. 3A and 3B housing the humidity sensor of FIGS. 4A and 4B covered with a potting insulation, and FIG. 9 shows an activity diagram of an estimation procedure according to an embodiment of the present invention.

DETAILED DESCRIPTION OF PREFERRED EMBODIMENTS OF THE INVENTION

Figure 1:
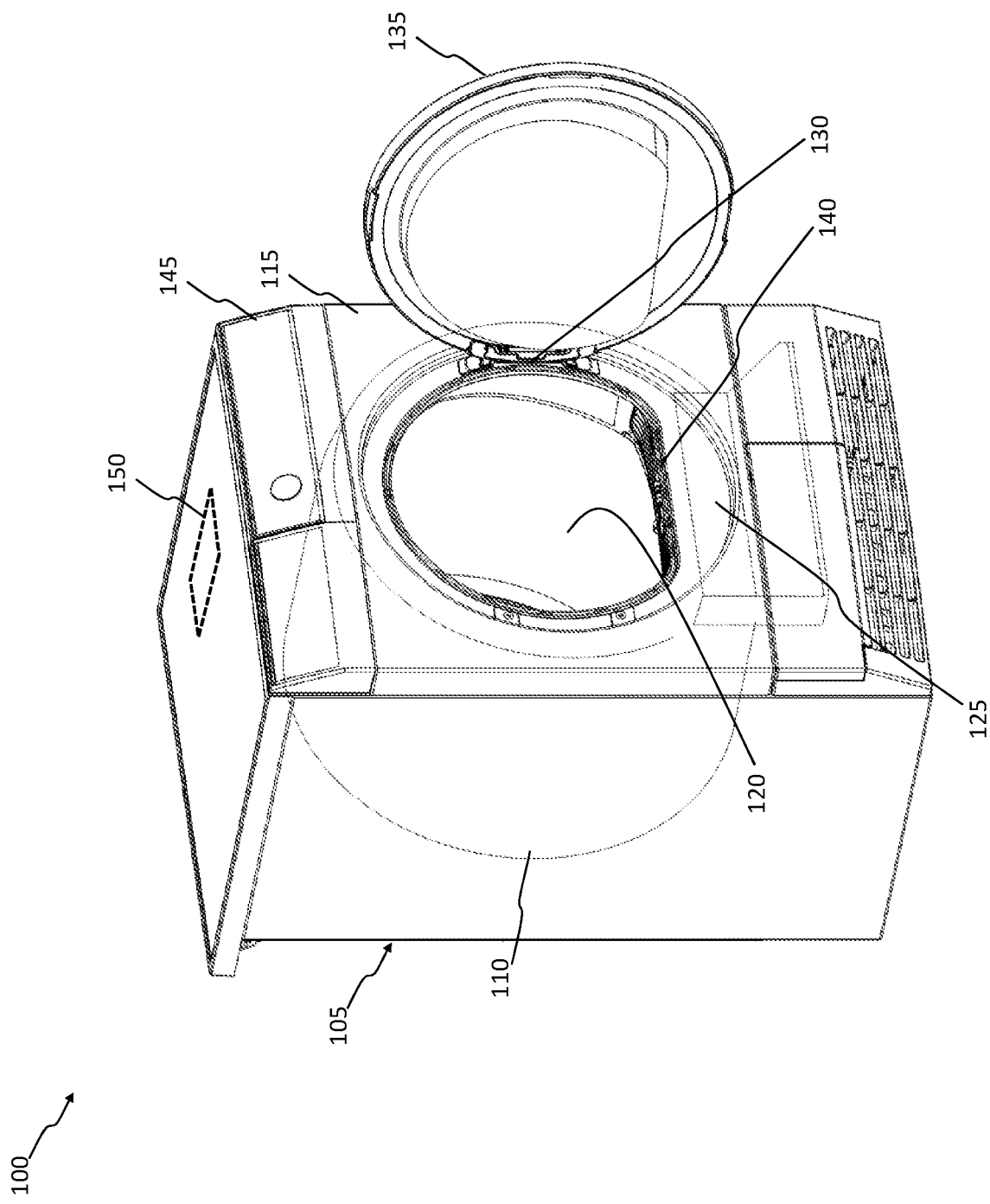
FIG. 1 is a perspective view of a laundry appliance according to an embodiment of the present invention.

With reference to the drawings, FIG. 1 shows a perspective view of a laundry appliance 100 according to an embodiment of the present invention. According to the exemplary, not limiting, embodiment herein considered, the laundry appliance 100 is a laundry dryer, such as a tumble drier. In any case, although in the following description explicit reference will be made to a laundry dryer, this should not be construed as a limitation; indeed, the present invention applies to other types of laundry appliances (for example washers/dryers, i.e. washing machines also having a laundry drying function), as well as other types of appliances having drying functions for items housed therein (such as dishwashers).

The laundry dryer 100 comprises a (e.g., parallelepiped-shaped) cabinet 105, which preferably accommodates a treatment chamber (i.e., a laundry drying chamber in the example herein considered of a laundry dryer) for the items to be dried (i.e., a laundry load in the example herein considered of a laundry dryer).

The laundry drying chamber is for example defined by the inner space of a, preferably rotatable, drum 110 which is adapted to contain the laundry load to be dried (in a washer/dryer, the laundry treatment chamber may instead comprise a washing basket or drum which is contained in a washing tub).

Preferably, the cabinet 105 also encloses electrical, electronic, mechanical, and hydraulic components for the operation of the laundry dryer 100.

A bottom portion of the cabinet 105 that, in use, faces the floor preferably comprises one or more supporting pins or feet (not shown), preferably vertically adjustable supporting feet to improve the contact with the floor and adjusting the position of the cabinet relative to the floor.

A front panel 115 of the cabinet 105 has a loading opening 120 providing an access to the drum 110 for loading/unloading the laundry load to be dried. Preferably, the loading opening 120 has a rim 125, preferably substantially annular in shape, in which door hinges 130 as well as door locking means (not shown) are arranged for, respectively, hinging and locking a door 135. The door 135 is adapted for sealably closing the loading opening 120 during the appliance operation.

A power cord (not shown in the drawings), preferably provided with a plug, exits from a rear side of the cabinet 105 (also not shown) opposite the front panel 115, and serves for powering the laundry appliance when connected to power mains.

Preferably, the drum 110 is rotatably supported on one or more rollers. Preferably the drum 110 is rotatably supported on a cabinet portion and/or a (e.g., plastic) basement (not shown) of the laundry appliance 100, the basement being for example adapted to accommodate a moisture condensing element and/or a drying air heating device. More preferably, the drum 110 is rotatably supported on a basement and/or on a cabinet portion by means of rollers (also not shown) mounted thereon. The rollers are preferably mounted on the basement by means of respective bushings or pins (not shown) provided on the basement, each pin being for example supported by a respective bracket (not shown) in the plastic basement.

The laundry dryer 100 preferably comprises a drying air circuit for causing drying air to circulate through the drum 110 where the laundry load to be dried is housed. The drying air circuit is not shown in the drawings, it being not relevant for the understanding of the present invention. Without losing generality, the drying air circuit may for example be an open-loop drying air circuit (wherein the drying air is: taken in from the outside ambient, heated up, caused to flow through the drum 110 to extract moisture from the laundry to be dried, then possibly de-moisturized and cooled down and finally exhausted to the outside ambient), or a closed-loop drying air circuit (wherein the drying air is: heated up, caused to flow through the drum 110 to extract moisture from the laundry to be dried, de-moisturized and cooled down, and then again heated up and reintroduced in the drum). The drying air circuit for de-moisturizing, cooling system and condensing may comprise an air-air heat exchanger or a heat pump exploiting a suitable refrigerant fluid. The drying air heater may comprise a Joule-effect heater; in case of use of a heat pump, one of the heat exchangers of the heat pump is used to cool down the moisture-laden drying air, whereas another heat exchanger of the heat pump may advantageously be exploited for heating the drying air.

The drying air circuit is for example designed such that the drying air is introduced into the drum 110 at or proximate to a rear portion thereof (rear with respect to the laundry appliance front, corresponding to the front panel 115). After flowing through the drum 110 (and hitting the laundry load contained therein), the drying air can leave the drum 110 passing through an air-opening 140 provided close to the rim 125 of the loading opening 120, on the inner side thereof (i.e., looking the laundry appliance frontally, behind the rim 125 of the loading opening 120).

In addition, a user interface 145 may be advantageously provided, preferably although not limitatively, on the front panel 105. Preferably, the user interface 145 may comprise one or more buttons and/or knobs that allow a user to select laundry treatment cycles (e.g., a set of operations and control parameters designed for treating peculiar fabrics, such as wool items) to be carried out by the laundry appliance 100.

Preferably, the laundry appliance 100 is further provided with a control unit 150 (schematically denoted as a dashed rectangle in FIG. 1), the control unit 150 preferably comprising at least one electronic board on which a main control circuitry is provided. The main control circuitry may comprise one or more microprocessors/microcontrollers, an application-specific integrated circuit—ASIC—or a similar electronic control component and, possibly, further processing circuitry such as a Digital Signal Processor—DSP—, etc.) adapted to control the laundry appliance 100 operation according to instructions received by a user through the user interface 145. As visible in the figure, the control unit 150 is preferably placed in a top position inside the casing, so as to be less prone to contacts with liquids or humidity possibly leaking from the drum 110.

For example, the control unit 150 provides power and interacts with the electrical/electronic/electromechanical components comprised in the laundry appliance 100—such as for example drum motor, electromechanical valves, pumps and impellers of the hydraulic apparatus, one or more heating elements for heating water/washing liquids/air, the user interface 145, etc.—in order to manage an execution of selected laundry-treating operations.

As better discussed in the following, the control unit 150 is also arranged for estimating a drying cycle duration from a current time instant (i.e., a residual time to the end of the drying cycle), and preferably, for periodically updating it during execution of the drying cycle.

The laundry dryer 100 is preferably equipped with a laundry load drying degree sensing function, advantageously exploited for controlling the progress of the laundry drying process. Preferably, the laundry load drying degree sensing function comprises a system for measuring the humidity degree of the laundry load to be dried, which is used to provide drying information including an estimation of a mass of the load, and/or an estimation of a residual humidity of the load, and/or an estimation of a residual time to the end of the drying cycle, and/or a detection of an end of the drying cycle (the system for measuring the humidity degree of the laundry load to be dried and an estimation procedure aimed at providing the drying information exploiting such a system will be discussed in the following).

Figure 2:
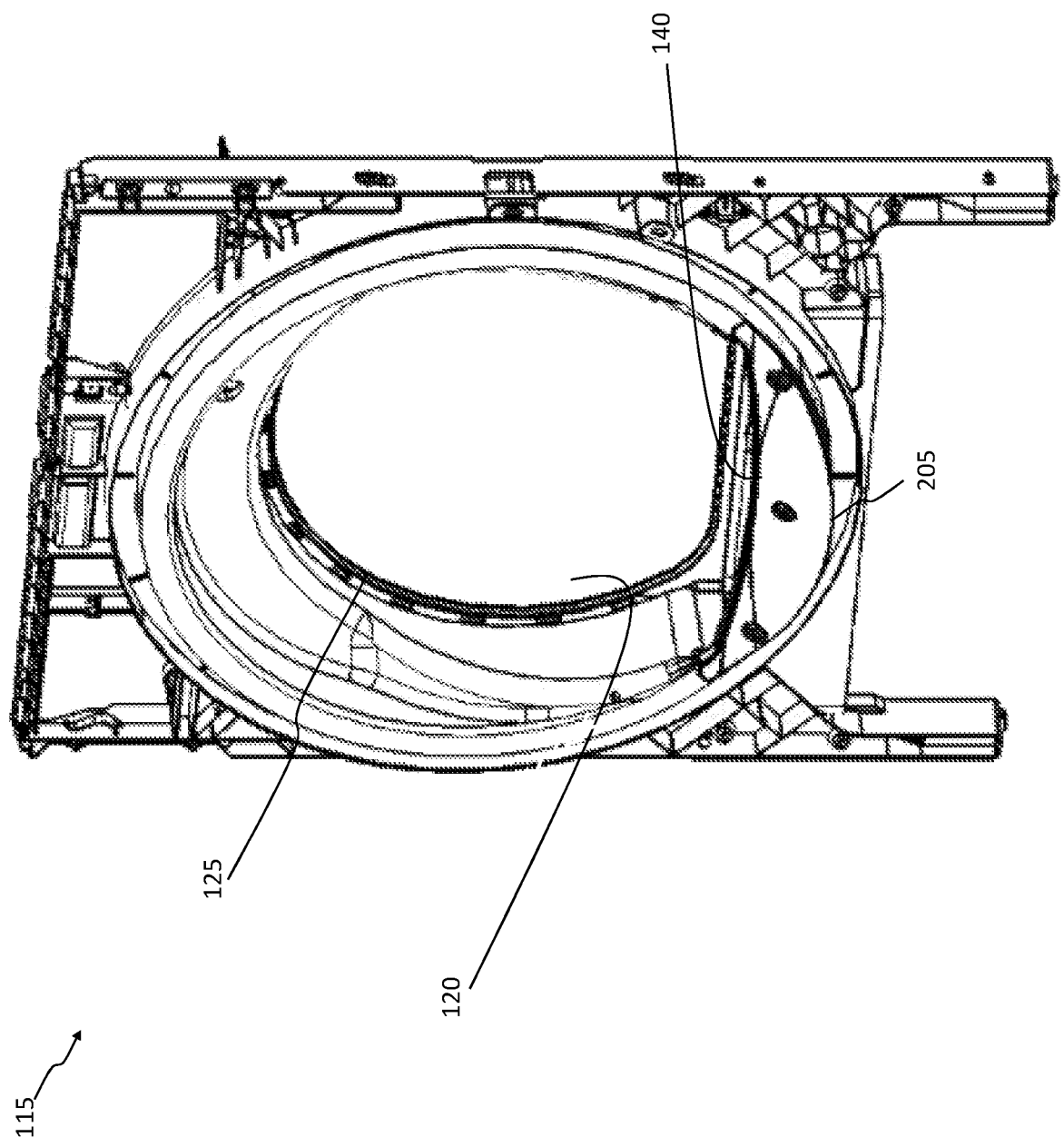
FIG. 2 is a perspective view of a front panel of the laundry appliance according to an embodiment of the present invention.

FIG. 2 is a view of the front panel 115 from behind, showing the inner side of the loading opening rim 125, facing towards the drum 110 (in FIG. 2, the front panel 115 is shown dismounted from the rest of the cabinet 110). A cover member, e.g. a cover plate 205, is preferably mounted on the inner side of the cabinet front panel 115, just below the rim 125 of the loading opening 120 in the illustrated example. In operation, the cover plate 205 faces the drum 110 and is in front of the laundry to be dried that, while tumbling inside the drum 110, falls by gravity to the bottom of the drum 110. Preferably, the cover plate 205 is made of a dielectric material, the cover plate 205 being for example made of a plastic material.

According to an embodiment of the invention, the cover plate 205 is arranged for housing at least part of the system for measuring the humidity degree of the laundry load to be.

FIGS. 3A and 3B are front and rear perspective views of a cover plate 205 which is adapted to house a humidity sensor according to an embodiment of the invention, and FIGS. 4A and 4B are front and rear plane views of a humidity sensor 400 according to an embodiment of the invention.

Preferably, the cover plate 205 has a structure that, when the cover plate 205 is connected to the front panel 105, defines a hollow space separated from the inner space of the cabinet 105 in which the drum 110 is contained.

Even more preferably, the cover plate 205 is connected to the front panel 105 in a substantially watertight manner, thus defining a hollow space sealed from the inner space of the cabinet 105 in which the drum 110 is contained.

The hollow space defined by the cover plate 205 connected to the front panel 105 is preferably adapted to operatively house the humidity sensor 400. More preferably, the cover plate 205 comprises a housing 305 arranged for housing the humidity sensor 400 (as described in the following). In this way, the humidity sensor 400 is substantially insulated from the inner space of the cabinet 105 in which the drum 110 is contained in its operating position.

In the example of FIGS. 3A and 3B, the cover plate 205 is shaped substantially as a circular segment, e.g. resembling a stylized "smile" in plan-view.

Particularly, the preferred cover plate 205 herein considered comprises first 310 and second 315 surfaces opposite to each other (in the following, for ease of description, the first 310 and second 315 surfaces will be referred to as outer 310 and inner 315 surfaces, respectively, it being understood that the relative terms "outer" and "inner" only refer to the orientation of the cover plate 205 taken in the figures).

Preferably, as illustrated, a sidewall 320 protrudes from a periphery of the cover plate 205 on the side of the inner surface 315 and substantially transversal thereto.

The sidewall 320 is preferably adapted to abut and/or engage with a portion of the front panel 105. The sidewall 320 is advantageously designed for coupling with the cover plate 205 (as visible in FIG. 2) and determines, at least partially, a height of the hollow space delimited by the cover plate 205 and the front panel 105.

The cover plate 205 further comprises one or more fastening receptacles, such as the three fastening receptacles 325 shown in the FIGS. 3A and 3B, which are adapted to receive a fastener (not shown in the figures) for fastening the cover plate 205 to the front panel 105.

In the example of FIGS. 3A and 3B, each fastening receptacles 325 comprises a receptacle sidewall 330 (preferably cylindrical in shape) protruding from the inner surface 315, and a receptacle base 335 at a free end of the receptacle sidewall 325.

In other words, each fastening receptacle 325 defines a substantially cylindrical depression extending (e.g., protruding or vertically extending) from the outer surface 310.

Each fastening receptacle 325 preferably comprises a fastener receiver, such as a through bore 340 in the example of FIGS. 3A and 3B, which is adapted to receive a fastener (such as a screw, a pin, a peg etc., not shown in the figures). The fastener receivable by the through bore 340 is preferably adapted to engage with a corresponding receiver (not shown) provided on the front panel 105 in order to connect the cover plate 205 to the front panel 105.

The housing 305 for the humidity sensor 400 of the cover element 205 comprises a perimeter sidewall 345, which protrudes from the inner surface 315 of the cover plate 205 and has a predetermined height (from the inner surface 315).

Preferably, the perimeter sidewall 345 has a size and a layout suitable for enclosing the humidity sensor 400; for example, as visible in FIG. 3B, the perimeter sidewall 345 has a substantially rectangular layout and a size that allows the perimeter sidewall 345 to enclose the rectangular-shaped humidity sensor 400.

Moreover, the perimeter sidewall 345 has a height arranged for containing the whole humidity sensor 400 and, preferably, also a potting insulation (not shown in FIG. 3B, but visible in FIG. 8—described later on—where it is denoted by number reference 805).

Additionally, the cover plate 205 may further comprise a coupling tab 350 designed for engaging a corresponding receptacle or hole in the front panel 105 in order to prevent a wrong coupling between the cover plate 205 and the front panel 105 and to provide a further stability to the connection of the cover plate 205 with the front panel 105.

In one embodiment of the invention, structural and physical properties of the cover plate 205 are selected in such a manner to avoid alterations in measurements performed by the humidity sensor 400.

Particularly, the material selected for the cover plate 205 should be such that its hygroscopic property (i.e., the ability of a substance to attract and hold water molecules from the surrounding environment) and its relative permittivity (the resistance of the material to the formation of an electric field) are suitable for preventing, or at least limiting, alterations to the measurements performed by the humidity sensor 400.

Moreover, a thickness of the cover plate 205—particularly a thickness defining the distances between the outer surface 310 and the inner surface 315 thereof—should be selected in order to suppress, or at least controlling, any effects on the measurements performed by the humidity sensor 400.

For example, the structural and physical properties of the cover plate 205 should be selected in order to ensure a reduced amount of electrostatic charge acquired by the cover plate 205 during the laundry appliance operation 100 (e.g., produced by a friction between laundry load in the drum 110 and the cover plate 205). According to an embodiment of the present invention, the structural and physical properties of the cover plate 205 are selected in order that an amount of electrostatic charge acquired by the cover plate 205 during the laundry appliance 100 operation maintains a conductivity of the cover plate in an interval ranging from $10^{11}$ $\Omega$/cm to $10^{12}$ $\Omega$/cm.

As mentioned above, the system for measuring the humidity degree of the laundry load to be dried comprises a humidity sensor 400 (FIGS. 4A and 4B are front and rear plan views thereof, respectively).

The humidity sensor 400 comprises an electronic capacitive humidity sensor, i.e. a humidity sensor arranged for sensing capacitance and/or capacitance variations associated with humidity of, and/or humidity changes in, the laundry load to be dried contained in the rotating drum 110.

According to an embodiment of the present invention, the humidity sensor 400 comprises an operating support, such as an electronic board 405 (e.g., a Printed Circuit Board, or PCB) on which a sensing arrangement 410, a control circuitry 415 and a connector interface 420 are provided.

Preferably, the sensing arrangement 410 comprises one or more top pads 425 (four in the example of FIGS. 4A and 4B) provided on a top surface 405a of the electronic board 405 and one or more back pads 430 (four in the example of FIGS. 4A and 4B) provided on a back surface 405b of the electronic board 405.

The top pads 425 and the back pads 430 are both made in an electrically conductive material, such as for example aluminum or copper.

Preferably, as illustrated, the top pad 425 and the back pad 430 have substantially the same shape, square in the example the FIGS. 4A and 4B, and substantially the same size. More preferably, the top pad 425 and the back pad 430 are provided substantially superimposed one to the other (at least in plan-view), but separated by the electronic board 405 (or at least by a dielectric portion of the electronic board 405).

According to an embodiment of the present invention, each top pad 425 and each back pad 430 may be made by using a respective metal layer of the electronic board 405 (e.g., in case of a PCB). Advantageously, metal layers provided on the top surface 405a and on the back surface 405b of the electronic board 405 (mainly provided for implementing conductive tracks coupling electronics components arranged on the electronic board 405) are (e.g., chemically and/or mechanically) etched in order to define the top pads 425 and back pads 430.

Preferably, although not strictly necessarily, both the control circuitry 415 and the connector interface 420 are provided on the same surface, such as the top surface 405a, of the electronic board 405.

Each top pad 425 and the back pad 430 of the sensing arrangement 410 is electrically connected to the control circuitry 415. For example, each top pad 425 is electrically connected to the control circuitry 415 by means of a respective top (conductive) track 435 provided on the top surface 405a of the electronic board 405 (as shown in FIG. 4A). Each back pad 430 is electrically connected to the control circuitry 415 by means of a respective back (conductive) track 440 provided on the back surface 405b of the electronic board 405, and by means of a respective (conductive) via 445 (visible in FIG. 4B) crossing the electronic board 405 from the back surface 405b to the top surface 405a, in order to electrically connect the respective back track 440 (and, therefore, the corresponding back pad 430 of the sensing arrangement 410) to the control circuitry 415 provided on the top surface 405a.

The control circuitry 415 is further electrically connected to the connector interface 420 by means of one or more conductive tracks, for example by means of a single conductive track 450.

The connector interface 420 is preferably adapted to electrically and, preferably, mechanically couple with one or more wirings (denoted by the number reference 505 in FIG. 5) for operatively coupling the humidity sensor 400 with the control unit 150 of the laundry appliance 100.

The connector interface 420 may be implemented with various arrangements.

For example, a connector device manufactured according to the Surface Mounting Technology (i.e., a "Surface Mounting Device"—SMD) is provided on the electronic board 405.

Alternatively, the wirings 505 may be welded directly to the electronic board 405 and electrically coupled with the control circuitry 415 by means of the track 450. Preferably, the wirings 505 are also connected to the control unit 150 of the laundry appliance 100. The wirings 505 allows the control unit 150 to supply electric power to the humidity sensor 400 and allows exchanging one or more data signals (e.g., sensing settings, humidity data, etc.) between the control unit 150 and the humidity sensor 400.

As a further alternative, the wirings 505 may be welded directly to the electronic board 405 and electrically coupled with the control circuitry 415 by means of the track 450. Preferably, a free end of the wirings 505 (not shown in the figures) is connected to a flying connector (i.e., a connector device, not shown in the figures). The flying connector is connected to a matching flying connector attached to a cable in its turn connected to the control unit 150.

According to an embodiment of the present invention, the control circuitry 415 of the humidity sensor 400 is configured for processing, or at least pre-processing, electric signals generated by the sensing arrangement 410 (which are based on a humidity of the laundry stored in the rotating drum 110) during the laundry appliance 100 operation, and the control unit 150 is arranged for estimating (and, preferably, periodically updating) the residual time to the end of the drying cycle according to said processed or pre-processed electric signals, as better discussed below.

For example, the control circuitry 415 may comprise one or more electronic components—such as for example, one or more microprocessors, microcontrollers, "Application-Specific Integrated Circuits" (ASICs), "Digital Signal Processors" (DSPs), and/or other electronic components (such as memory elements etc.)—arranged for filtering, amplifying and digitalizing, and/or otherwise manipulating electric (analogic) signals provided by the sensing arrangement 410 prior to providing such electric signals to the control unit 150 of the laundry appliance 100 by forwarding electronic (preferably digital) signals (based on the processing or pre-processing of the electric signals mentioned above) through the wirings 505 connected to the connector interface 420 of the humidity sensor 400.

Preferably, the humidity sensor 400 further comprises on or more fastening elements in the electronic board 405, such as one or more through holes—two fastening through holes 455 are shown in FIGS. 4A and 4B. Such fastening through holes 455 are provided for allowing the humidity sensor 400 to be fastened to the cover plate 205 (as described in the following).

The pictorial schematic of FIG. 5 is useful to understand the system for measuring the humidity degree of the laundry load to be dried according to an embodiment of the present invention.

The number reference 502 denotes an electronic board, such as for example a "Printed Circuit Board" (PCB), or a plurality (system) of PCBs, belonging to the control unit 150 of the laundry appliance 100, shown schematically and with only a few of the (several other) electronic/electromechanical components actually present in the laundry appliance 100.

A DC (Direct Current) power supply generation circuit 510 generates the DC electric potentials for supplying the electronics. For the purposes of the present invention, the DC power supply generation circuit 510 generates two DC electric potentials Vcc and Vref, where the value of the electric potential Vcc, being the supply voltage for the electronics, is equal to the value of the electric potential Vref, being the reference voltage for the electronics, plus a nominally constant value Vcc which is typically 5V, or 3.3V, or less, depending on the families of Integrated Circuits to be power supplied. The two DC electric potentials Vcc and Vref are distributed, i.e. routed, through the PCB (or plurality of PCBs) 502 by means of a system of conductive tracks, comprising conductive tracks 515 for routing the electric potential (supply voltage) Vcc, and conductive tracks 520 for routing the electric potential (reference voltage) Vref, so as to be brought to the locations, on the PCB 502, where electronic components are placed. In alternative embodiments, conductive wires may replace the conductive tracks 515 and/or the conductive tracks 520.

The DC power supply generation circuit 510 generates the two DC electric potentials Vcc and Vref starting from an AC voltage (e.g., 230 V @ 50 Hz, or 110 V @ 60 Hz) supplied by an AC power distribution network to the premises of the users. Electric terminals TL and TN on the PCB 502 receive a line AC voltage Line and a neutral AC voltage Neutral when the appliance is plugged to an AC main socket 525. The DC power supply generation circuit 510 preferably comprises transformers, capacitors, rectifiers, and DC voltage regulators. The AC main socket 525 (and the appliance plug) also has a ground contact providing a ground potential. In order to comply with safety prescriptions imposing that the user must not receive electric shocks in case he/she touches any part of the appliance that can be at the reach of the user body, such appliance parts are kept to the ground potential. It is pointed out that the electric potential (reference voltage) Vref for the electronics is typically not equal to the ground potential. In some embodiments, the laundry appliance 100 could even have no connection to the ground earth potential (Class II machines), this not affecting the implementation of the present invention.

Preferably, as illustrated, the DC electric potentials Vcc (supply voltage) and Vref (reference voltage) are routed and supply DC power to an main control circuitry, schematized as a functional block 530, that governs the appliance operation.

The DC electric potentials Vcc and Vref are routed, and supply DC power is thus fed, to the humidity sensor 400 through the wirings 505. For example, the wirings 505 may comprise a first wire for providing the DC electric potential Vcc and a second wire for providing the DC electric potential Vref to the humidity sensor 400.

Advantageously, the wirings 505 allows an exchange of electrical signal between the humidity sensor 400 and the main control circuitry 530 of the control unit 150. For example, one or more wires of the wirings 505 may be provided for allowing the exchange of electric signals between the humidity sensor 400 and the main control circuitry 530. Preferably, the capacitance variations detected by the humidity sensor 400 are analyzed for deriving information about the degree of humidity of the laundry load being dried. As mentioned above, this information about the degree of humidity of the laundry load is provided to the main control circuitry 530 for estimating (or updating) the residual time to the end of the drying cycle (and, possibly, for adapting the on-going drying program on the go) based on the detected conditions of humidity of the laundry load). In any case, the information about the degree of humidity of the laundry load provided by the humidity sensor 400 may also be used for other purposes, such as for estimating a load mass (as better discussed in the following) and/or for sensing an end of the drying cycle (as better discussed in the following, and/or for estimating the amount of water contained in the laundry load to be dried before starting a drying cycle (so that the main control circuitry 530 of the control unit 150 may accordingly determine and set control parameters that will be used during the following drying cycle).

The top pads 425 and back pads 430 may be used either individually or in combination (as described in the following) as first plates of one or more respective capacitors, these capacitors comprising at least part the control unit 150 exploited as second plates and the laundry load in the drum 110 corresponding to, at least part of, the dielectric between the first and second plates.

According to an embodiment of the present invention, the humidity sensor 400 is configured to implement a self-capacitance sensing, schematized in FIG. 5. Essentially, in the self-capacitance sensing the capacitances between top pads 425 and back pads 430, and a reference electric potential is measured.

Preferably, the reference electric potential is the DC reference voltage Vref at the control unit 150.

According to an embodiment of the present invention, the humidity sensor 400 drives a current to each one of the top pads 425 and/or of the back pads 430 and measures the respective voltages Vtx and Vbx (referred to the DC reference voltage Vref) that develops across the unknown capacitance(s) $Ct_x$ (between each plate at the control unit 150, at the DC reference voltage Vref, and each one of the top pads 425) and across the unknown capacitance(s) $Cb_x$ (between each plate at the control unit 150, at the DC reference voltage Vref, and each one of the back pads 430), the values of the capacitance(s) Ctx and Cbx are to be determined.

In FIG. 5, thin curves 550 schematize the electric field lines that start at the top pads 425 and/or back pads 430 on the humidity sensor 400 and end at the conductive tracks 520 that, in the PCB (or plurality of PCBs) 505, route the reference electric potential Vref.

It is pointed out that the electric field lines do not end at the drum 110, because the drum 110 is not at the DC reference voltage Vref, being instead at a different electric potential. In particular, the actual electric potential of the drum 110 may depend on the circumstances, and it is not necessarily the ground potential. For example, let it be supposed that the drum 110 is driven by a belt (which, due to the material of which it is made, has a certain electric impedance). The belt, through pulleys, is driven by an electric motor, which, for safety prescriptions, is kept to the ground earth. Thus, in this example the drum 110 may be connected to the ground earth, but (due to the impedance of the belt) is at a potential different from the ground earth. At the same time, the drum 110 is not at the DC reference voltage Vref, which, as pointed out in the foregoing, is typically not the ground.

FIG. 6 schematizes capacitance components comprised in a total capacitance measured by the system for measuring the humidity degree according to an embodiment of the present invention. References $Ct_x$ and $Cb_x$ denotes the capacitors whose unknown capacitances Ctx and Cbx, respectively, is to be determined. The capacitors $Ct_x$ and $Cb_x$ have a dielectric that is substantially formed by: the cover plate 205 (with capacitive components $Ct_{cover}$ and $Cb_{cover}$), laundry load 605 (with capacitive components $Ct_{laundry}$ and $Cb_{laundry}$) contained in the drum 110, and air (with capacitive components $Ct_{air}$ and $Cb_{air}$) in the laundry appliance 100.

Each capacitor $Ct_x$ and $Cb_x$ has a (first) plate formed by a respective top pad 425, or back pad 430, provided on the humidity sensor 400. The other (second) plate of each capacitor $Ct_x$ and $Cb_x$ is formed by (e.g., one or more respective portions of) the conductive tracks 520 in the PCB 502 routing the reference electric potential (reference voltage) Vref.

Since the permittivity of the laundry load housed in the drum 110 varies considerably according to the laundry load humidity, the capacitances Ctx of the capacitors $Ct_x$ and the capacitances Cbx of the capacitors $Cb_x$ varies according to a degree of humidity of the laundry load in the drum 110. Thus, by sensing the capacitances Ctx and Cbx of the capacitors $Ct_x$ and $Cb_x$ an indication of the laundry load humidity degree can be derived.

Methods for measuring capacitances are known in the art, and are not limitative for the present invention.

Some known methods for measuring capacitances make use of a switched capacitor network comprising the capacitors $Ct_x$ and $Cb_x$ whose unknown capacitances Ctx and Cbx are to be determined, a reference capacitor of known capacitance (not shown, for example comprised in the control circuitry 415 of the humidity sensor 400 and, possibly, larger than the unknown capacitance to be determined), and an arrangement of switches (not shown, for example comprised in the control circuitry 415 of the humidity sensor 400).

One known capacitance measuring method using a switched capacitor network is the "charge transfer" method: the capacitors $Ct_x$ and $Cb_x$ (whose unknown capacitances Ctx and Cbx are to be determined) are repeatedly charged to the voltage of a voltage source, and its charge is then transferred to a reference capacitor. By counting the number of times the capacitors $Ct_x$ and $Cb_x$ need to be charged and their charge transferred to the reference capacitor until the latter is charged up to a threshold (voltage) value (or by measuring the time needed to charge the reference capacitor up to the threshold voltage value), it is possible to derive the value of the unknown capacitance. Preferably, countermeasures are taken for increasing the immunity against noise, like for example averaging.

Another known measuring method using a switched capacitor network is the "sigma-delta modulation" method. Differently from the charge transfer method, the reference capacitor is not charged from an initial voltage to a threshold (reference) voltage, rather the voltage across the reference capacitor is modulated about the reference voltage in charge up and charge down steps. The capacitors $Ct_x$ and $Cb_x$ (whose unknown capacitances Ctx and Cbx are to be determined) are coupled to a feedback loop of a sigma delta modulator. The capacitors $Ct_x$ and $Cb_x$ are switched between a voltage source and a reference capacitor (by means of a first switch, coupled between the voltage source and a first node of the capacitors $Ct_x$ and $Cb_x$, and a second switch, coupled between the first node of the capacitors $Ct_x$ and $Cb_x$ and the first node of the reference capacitor), and charge is transferred from the capacitors $Ct_x$ and $Cb_x$ to the reference capacitor.

As the charge in the reference capacitor increases by charge transfer from the capacitors $Ct_x$ and $Cb_x$, so does the voltage across it. The voltage across the reference capacitor is fed to one input of a comparator, whose other input is kept at the threshold voltage. When the input of the comparator reaches the threshold voltage, a discharge circuit (e.g., a resistor in series to a switch) in shunt to the reference capacitor is activated and the reference capacitor is discharged at a rate determined by the starting voltage across the reference capacitor and the resistance of the discharge circuit. As the voltage across the external capacitor decreases, it again passes the threshold voltage and the discharge circuit is deactivated. The charge/discharge cycle is then repeated: charge is again transferred from the capacitors $Ct_x$ and $Cb_x$ to the reference capacitor, to increase again the voltage across the reference capacitor, and so on. The charge/discharge cycle of the reference capacitor produces a bit stream at the comparator output. Such bit stream is put in logical 'AND' with a pulse-width modulator to enable a timer. The timer output is used for processing the extent of the change of the capacitances Ctx and Cbx.

Another known capacitance measuring methods is the "RC method": in this case, the unknown capacitance to be determined is derived from the time needed to charge or discharge the capacitor whose capacitance is to be determined through a resistor of known resistance.

A further known method for measuring a capacitance is the "Wheatstone bridge method": in this method, a Wheatstone bridge is balanced in order to bring unbalance currents to zero.

Regardless of the method being used to determine the unknown capacitance, according to the present invention:

an electric signal from the humidity sensor 400 (hereinafter, capacitive electric signal) is provided to the control unit 150 (and, particularly, to the main control circuitry 530 thereof) in the following form:

$$\delta C(t) + \Gamma$$

where the coefficient $\delta$ depends on measurement frequency and/or current, $C(t)$ is the capacitance (substantially depending on capacitance $Ct_x$ and/or on capacitance $Cb_x$) and $\Gamma$ is an offset of the capacitive electric signal with respect to a reference level; and the control unit 150 (and, particularly, the main control circuitry 530 thereof) is arranged for, based on the capacitive electric signal (or, advantageously, as mentioned above and better discussed in the following, a version thereof processed in the control circuitry 415 of the humidity sensor 400 and/or in the main control circuitry 530 itself), estimating a mass of the load, and/or estimating a residual humidity of the load, and/or estimating a residual time to the end of the drying cycle, and/or detecting an end of the drying cycle.

It should be noted that the top pads 425 or back pads 430 provided on the humidity sensor 400 according to the present invention may be exploited in a number of different manners in order to measure the humidity of the laundry load in the drum 110.

For example, the top pads 425 may be used individually, each forming a respective capacitors $Ct_x$ with the conductive tracks 520 that route the reference electric potential Vref; thus, each providing a respective capacitance Ctx measurement.

Alternatively, the top pads 425 may be used together as a single probe in order to achieve a higher sensitivity, i.e. top pads 425 forms a single capacitor $Ct_x$ with the conductive tracks 520 that route the reference electric potential Vref, thus each providing a single capacitance Ctx measurement.

Similarly, the back pads 430 may be used individually, each forming a respective capacitors $Cb_x$ with the conductive tracks 520 that route the reference electric potential Vref; thus, each providing a respective capacitance Cbx measurement.

Alternatively, the back pads 430 may be used together as a single probe in order to achieve a higher sensitivity, i.e. back pads 430 forming a single capacitor $Cb_x$ with the conductive tracks 520 that route the reference electric potential Vref, thus each providing a single capacitance Cbx measurement.

In other words, top pads 425 and back pads 430 of the sensing arrangement 410 may be used individually, thus obtaining a plurality of electric signals associated with the humidity of the laundry load, or together, thus obtaining two probes featuring a high sensitivity (at least higher than a sensitivity of the single top pad 425 or back pad 430), i.e. able to collect a greater electric signal associated with the humidity of the laundry load.

Additionally or alternatively, couples of top pads 425 and back pads 430 may be used for obtaining one or more differential measurements of the humidity of the laundry load to be treated by the laundry appliance 100. For example, the measures of each top pad 425 and of back pad 430 superimposed to the former are combined (e.g., subtracted and, possibly, processed in a feedback loop by the control circuitry 415) in order to obtain a corresponding measurement of a differential type. This allows to suppress, or at least to substantially reduce, noises and offsets due to common mode sources (known in the art and, thus, not herein further discussed for the sake of brevity).

As a further alternative or addition, top pads 425 may be used together with corresponding back pads 430 in order to provide a configuration of the sensing arrangement 410 comprising one or more sensing pads (e.g., comprising the top pads 425) associated with respective one or more shield pads (e.g., comprising the back pads 430). Such configuration of the sensing arrangement 410 ensures a substantial noise suppression and improves sensitivity (in terms of signal penetration in the laundry load) of the humidity sensor 400.

As a yet further alternative, top pads 425 and back pads 430 of the sensing arrangement 410 may be used according to a ratiometric method in which the humidity sensor 400 further comprises a reference capacitor (not shown in the drawings, for example comprised in the control circuitry 415).

According to an embodiment of the present invention, humidity measurements based on the top pads 425 and back pads 430 are combined with temperature measurements (e.g., accounting for the temperature within the drum 110) in order to analyze a relationship between humidity and temperature during the treatment of laundry load in order to dynamically controlling and improving the operation of the laundry appliance 100. For example, the laundry appliance 100 may comprise a temperature sensor (not shown in the drawings), such as a temperature sensor comprising a Negative Temperature Coefficient (NTC) resistor. In one embodiment of the invention (not shown), the temperature sensor may be provided on the humidity sensor 400, for example comprised in, or electrically connected to, the control circuitry 415 thereof. Additionally or alternatively, one or temperature sensors (for example, NTC resistors) may be provided in the appliance 100 for determining the temperature outside the drum or at specific locations of the appliance. Advantageously, the temperature measurements are used by the control unit 150 (together with the capacitive electric signals) to estimate a residual humidity of the laundry load (and, hence, a residual time to the end of the drying cycle), as discussed below.

As shown in FIG. 7, which is a perspective detail view of the cover plate 205 housing the humidity sensor 400, the humidity sensor 400 is preferably coupled with the cover plate 205 at the housing 305.

Preferably, the humidity sensor 400 is positioned within the housing 305 in such a way that centering pins, such as the two centering pins 710 shown in the example of FIG. 7, are inserted into respective fastening through holes 455 of the electronic board 405.

Preferably, the centering pins 710 are made in plastic material (for example, of the same material as the cover plate 205), even more preferably the centering pins 710 are made integral with (i.e., in a single piece of) the cover plate 205.

Once the centering pins 710 are inserted in the respective through holes 455 of the electronic board 405, the centering pins 710 may be welded, either ultrasonically or thermally, in order that the humidity sensor 400 is firmly held within the housing 305.

Preferably, the welding of the centering pins 710 allows the humidity sensor 400 to be maintained substantially in contact with the inner surface 315 of the cover plate 205 delimited by the perimeter sidewall 360 of the housing 305. For example, the humidity sensor 400 is arranged in the housing 305 with the back surface 405*b* and, thus, the back pads 430 of the sensing arrangement 410, substantially in contact with the inner surface 315 of the cover plate 205.

It should be noted that having both the control circuitry 415 and the connector interface 420 on the same surface 405a of the electronic board 405 of the humidity sensor 400 allows the back pads 430 provided on the opposite surface 405b to be substantially in contact with the inner surface 315 of the cover plate 205.

As mentioned above, wirings 505 are electrically coupled to the connector interface 420 of the humidity sensor 400. The wirings 505 are arranged for providing power supply and exchange data to/from the control unit 150 of the laundry appliance 100. Since the humidity sensor 400 operation may be negatively affected by surface moisture that may deposit on the humidity sensor 400 during the laundry appliance 100 operation and cause sensing errors, short circuits and/or corrosion of metal parts of the humidity sensor 400, the humidity sensor 400 is insulated from the environment. For example, the humidity sensor 400 may be protected by a potting encapsulation 805 as shown in FIG. 8, which is a perspective detail view of the cover plate 205 housing the humidity sensor 400 encapsulated by the potting encapsulation 805.

Preferably, the potting encapsulation 805 may comprise (flowable) insulating materials such as for example silicones, epoxies, polyesters, and urethanes.

In one embodiment of the invention, the insulating materials are injected or deposited over the humidity sensor 400 in the housing 305. Preferably, the whole housing 305 is filled with the insulating materials. Even more preferably, the insulating materials are deposited in the housing until are substantially flush with a free end of the perimeter sidewall 360. In other words, the insulating materials fill the whole volume delimited by the perimeter sidewall 360 from the inner surface 315 upwards for total height of the sidewall 360. Therefore, the potting encapsulation 805 encloses the humidity sensor 400, the centering pins 710 and a portion of the wirings 505.

The insulating materials are then cured (e.g., by applying a predetermined temperature to the insulating materials), thus obtaining the potting encapsulation 805 that covers the humidity sensor 400 preventing moisture, water and/or foreign matters to contact any parts thereof.

For example, the humidity sensor 400 is positioned into a plastic 'bath' used for forming the cover plate 205, subsequently the insulating materials are poured onto the humidity sensor in place in the plastic bath after that already contains the humidity sensor 400.

Thanks to the humidity sensor 400 and the cover plate 205 according to the embodiments of the present invention it is possible to perform measurements of the humidity of laundry load stored in the drum 110 to be, or being, treated by the laundry appliance 100 in a plurality of different manners at the same time ensuring a substantial accuracy and precision of the measurements—as discussed below.

It should be noted that a mounting operation of the humidity sensor 400 in the laundry appliance 100 according to the present invention is simple allowing a simple manufacturing of the laundry appliance 100. Moreover, the structure of the cover plate 205 and the potting encapsulation 805 ensure a substantially thorough insulation of the humidity sensor 400 from moisture and foreign matters that could compromise a functionality thereof, at the same time without impairing sensing performance of the humidity sensor 400.

With reference now to FIG. 9, it shows an activity diagram of an estimation procedure 900 carried out by the control unit 150 (particularly, by the main control circuitry 530) according to an embodiment of the present invention. Broadly speaking, the estimation procedure 900 is generally aimed at carrying out at least one among:

an estimation of a mass of the load (hereinafter, load mass estimation);

an estimation of a residual humidity of the load (hereinafter, residual humidity estimation);

an estimation of a residual time to the end of the drying cycle (hereinafter, time-to-end estimation), and a detection of an end of the drying cycle (hereinafter, end cycle detection)

according to the capacitive electric signals from the humidity sensor 400.

The estimation procedure 900 in the preferred embodiment discussed below is exemplary aimed at carrying out all among load mass estimation, residual humidity estimation, time-to-end estimation and end cycle detection; in any case, as progressively detailed in the following while discussing the estimation procedure 900, each one among load mass estimation, residual humidity estimation, time-to-end estimation and end cycle detection may form an independent aspect of the present invention.

With reference to the activity diagram, the estimation procedure 900 according to a preferred embodiment of the present invention starts by estimating load information according to the capacitive electric signal (step 905), the load information comprising for example an indication of the amount of the load (hereinafter, load mass) within the drying chamber. Preferably, said estimation of the load mass (hereinafter, load mass estimation), or at least the acquisition and processing of the capacitive electric signal for performing load mass estimation, is carried out at an initial phase of the drying cycle.

From now on, by initial phase of the drying cycle it is meant a time interval that the user, from the start of a drying program, is supposedly willing to wait for in order to obtain a load mass estimation (and/or an initial time-to-end estimation, discussed in the following) with a certain degree of accuracy and reliability. Just as an example, the initial phase may comprise a time interval within the first 90 seconds from the start of drying cycle. According to an embodiment, the initial phase may be identified by specific movements of the drum (for example, by specific rotation speeds of the drum and/or by specific combinations of clockwise and anti-clockwise rotations of the drum that are exclusively or mainly carried out in such initial phase rather than in the subsequent course of the drying program) and/or the end of the initial phase may be identified by the displaying of the estimation(s) on a display unit (not shown) of the laundry appliance 100 and/or by audible signals emitted by the laundry appliance 100.

Back to the activity diagram, although in the exemplary embodiment herein discussed the load mass estimation is carried out at an initial phase of the drying cycle, this should not construed limitatively. Indeed, thanks to the accuracy and precision of the capacitive electric signal provided by the humidity sensor 400, load mass estimation may be carried out at any time during the execution of the drying cycle (e.g. during a phase of the drying cycle following the initial phase, in the following referred to as main phase).

According to a first embodiment of the load mass estimation, the control unit 150 is arranged for determining, by means of a regression, an indication of a correlation between the capacitive electric signal, the load mass and the water mass, and one or more operation parameters among:

temperature inside the drying chamber (e.g., provided by the above-cited temperature sensor, not shown, located on the humidity sensor 400);

temperature outside the drying chamber (e.g., provided by a further temperature sensor, also not shown, for example located at the main control circuitry 530);

motor torque, and control inputs (such as air mass flow, power supply, compressor speed, and/or compressor adsorbed power), and, hence, for inferring or estimating the unknown load mass according to the determined correlation and to one or more acquisitions of the capacitive electric signal.

According to a second embodiment of the load mass estimation, the control unit 150 is arranged for classifying the load mass in categories (e.g., "small", "medium", "large") based on a machine learning algorithm.

Preferably, to train the algorithm, a training set of acquired data with known load mass is used, with peculiar parameters of the capacitive electric signal (hereinafter, signal parameters) that are advantageously used to characterize the training algorithm. As used herein, by signal parameter it is meant an individual measurable property of the capacitive electric signal (and is related to the notion of "feature" in machine learning and pattern recognition and to that of "explanatory variable" used in statistical techniques such as linear regression), as opposed to time-variant operating signals extracted from the same capacitive electric signal (and discussed below).

Examples of signal parameters that can be used to this purpose are, but are not limited to:

average of the capacitive electric signal (strictly related to the capacitance of the load and thus to a combination of load mass and water mass);

standard deviation of the capacitive electric signal (mainly related to the amount of water in the load);

percentage of samples of the capacitive electric signal above a first (or upper) threshold value (for example, higher than a minimum value of the capacitive electric signal), the minimum value of the capacitive electric signal being preferably kept until a new minimum value is detected, and percentage of samples of the capacitive electric signal below a second (or lower) threshold value (for example, lower than the minimum value of the capacitive electric signal); the upper and lower threshold values preferably represent boundaries of opposite categories (such as "small" and "large" categories, respectively), as will be understood from the following discussion.

In any case, other signal parameters (such as energy or harmonic frequencies) or other appliance parameters (such as temperature information, mean and variance of the motor torque), could be envisaged in order to characterize the training algorithm.

Preferably, the above signal parameters are determined at (i.e., extracted or derived by) the control circuitry 415 of the humidity sensor 400.

Load mass classification may be achieved, for example, by means of a multiclass classification approach (e.g., based on "Support Vector Classification), or by a regression (e.g., based on "Support Vector Regression") followed by a consistent classification, or by a multiple binary classification approach.

Considering for example the multiple binary classification approach, "One-vs-rest" strategy is preferably used. In the example at issue of three load mass categories ("small", "medium", "large"), the multiclass classification can for example be reduced to two "One-vs-rest" classifications, namely a first "One-vs-rest" classification aimed at checking whether the load mass can be classified in the "small" category, and a second "One-vs-rest" classification aimed at checking whether the load mass can be classified in the "large" category, with the load mass that is classified in the "medium" category if it is not classified in the "small" category nor in the "large" category. In order to achieve that, for instance, two (among the above four) signal parameters are selected that best separate categories in a training set of tests (such as for example, mean and percentage of samples below the lower threshold value for the "small" category, and standard deviation and percentage of samples above the upper threshold value for the "large" category. Mathematically speaking, the first and second "One-vs-rest" classifications translate into checking whether a linear combination of the respective chosen signal parameters with suitable coefficients (preferably calculated offline in an algorithm training phase) is larger or smaller than zero.

According to the preferred embodiment of the present invention herein considered, the load mass estimation is advantageously used for estimating the residual time to end of the drying cycle (as better discussed in the following). In any case, the load information (such as the load mass estimation herein assumed) may also represent an aspect independent from, and alternative to, that of the estimation of the residual time to end of the drying cycle (in this respect, any advantageous feature discussed in connection with the load mass estimation in the context of the time-to-end estimation also applies to the load mass estimation, or generally to load estimation, when being end in itself).

Back to the activity diagram, the estimation procedure 900 preferably carries out, still at the initial phase of the drying cycle, an estimation of the residual time to the end of the drying cycle, preferably still according to the above signal parameters (or at least a subset thereof)—step 910. This estimation is preferably aimed at providing, already from the beginning the drying cycle, a first, rough or preliminary indication to the user about an approximate residual time to the end of the drying cycle, this estimation being intended to be refined or updated during the main phase of the drying cycle (e.g. either taking into account the time-to-end estimation carried out at the initial phase of the drying cycle, or independently from it, as detailed below). From now on, the time-to-end estimation carried out at the initial phase of the drying cycle will be referred to as initial time-to-end estimation, in order to distinguish it from the one or, preferably, more time-to-end estimations carried out during the main phase of the drying cycle (and referred to as main time-to-end estimations).

The initial time-to-end estimation may also be omitted in embodiments of the present invention, for example in embodiments wherein no preliminary indication to the user about an approximate residual time to the end of the drying cycle since the very beginning of the drying cycle is desired or required, and/or in embodiments wherein the initial time-to-end estimation is not taken into account for the following main time-to-end estimations.

Moreover, when both load mass estimation and initial time-to-end estimation are envisaged (as in the exemplary embodiment herein considered), they do not necessarily need to be executed in the illustrated order (for example, they may be executed in reverse order or substantially concurrently).

As mentioned above, the initial time-to-end estimation is preferably carried out according to the above signal parameters (or at least a subset thereof). More preferably, the initial time-to-end estimation is carried out according to the same signal parameters used for performing load mass estimation, namely average of the capacitive electric signal, standard deviation of the capacitive electric signal, percentage of samples of the capacitive electric signal above an upper threshold value, and percentage of samples of the capacitive electric signal below a lower threshold value (according to specific design options, the upper and lower threshold values set for the initial time-to-end estimation being equal or at least partly different from the upper and lower threshold values set for the load mass estimation). This preferred embodiment of the present invention arises from the finding of the Applicant that these signal parameters extracted from the capacitive electric signal at the very beginning of the drying cycle have a reliable correlation with the degree of humidity of the load contained in the drying chamber (or, otherwise stated, with a combination of load mass and its wetting in the drying chamber), and hence with the time-to-end estimation—in any case, similarly to load estimation discussion, other signal parameters (such as energy or harmonic frequencies) or other appliance parameters (such as temperature information, mean and variance of the motor torque) could be considered additionally or alternatively to one or more of the above signal parameters.

According to a preferred embodiment of the present invention, in order to perform the initial time-to-end estimation, the control unit 150 is arranged for determining (e.g., for a training set of samples of the signal parameters) regression functions each one indicative of a correlation between a respective signal parameter and the residual time to the end of the drying cycle, thereafter the control unit 150 is arranged for performing a linear combination of the signal parameters (e.g., of a new set of samples of the signal parameters) weighted (e.g., by means of proper coefficients) according to the respective regression functions, and to output the initial time-to-end estimation accordingly.

With respect to the known solutions, wherein the initial time-to-end estimation is often just a guess, based on average load mass, average wetting level and standard textiles blends, the initial time-to-end estimation that is obtained thanks to the humidity sensor 400 and the processing discussed has a surprising degree of accuracy.

Back to the activity diagram, the estimation procedure 900 then provides a main time-to-end estimation during the main phase of the drying cycle (steps 915-935). As mentioned above, in the exemplary embodiment herein considered, the main time-to-end estimation is preferably based on the load mass estimation carried out at the initial phase of the drying cycle (step 905), although this should not construed limitatively.

More particularly, the main time-to-end estimation starts by determining (step 915), from the capacitive electric signal, at least one (preferably, two or more) among the following operating signals:
- an operating signal indicative of an average value of the capacitive electric signal (hereinafter, average operating signal);
- an operating signal indicative of an oscillation of the capacitive electric signal around the average value thereof (hereinafter, oscillating operating signal);
- an operating signal indicative of a behavior of the capacitive electric signal above a first threshold value higher than the average value;
- an operating signal indicative of a behavior of the capacitive electric signal below a second threshold value lower than average value (hereinafter, both the operating signal indicative of a behavior of the capacitive electric signal above the first threshold value and the operating signal indicative of a behavior of the capacitive electric signal below the second threshold value will be concisely referred to as peak operating signal), and
- an operating signal indicative of a minimum of the capacitive electric signal and representing, for example, a sort of baseline signal (hereinafter, baseline operating signal).

Preferably, the operating signals are determined from the capacitive electric signal based on proper hardware or software circuitry in the humidity sensor 400 (and/or in the main control circuitry 530), the hardware or software circuitry including for example an analog or digital low pass filter for determining the average operating signal, and/or analog or digital band-pass or high-pass filters (preferably, followed by an analog or digital RMS converter) for determining the oscillating operating signal, and/or analog or digital moving average filters for determining the peak and baseline operating signals.

Preferably, in addition to the average, oscillating, peak and baseline operating signals, the control unit 150 also receives an operative signal indicative of the temperature within the drying chamber (hereinafter, temperature operating signal). The temperature operating signal is preferably obtained based on temperature measurements by the temperature sensor provided on the humidity sensor 400 (for example, comprised in, or electrically connected to, the control circuitry 415 thereof, as discussed above).

Back to the activity diagram, the estimation procedure 900 then estimates a residual humidity of the load (in the following also referred to as residual humidity estimation) at a time instant $t_i$ based on one or more (preferably two or more) among the average, oscillating, peak, baseline and temperature operating signals at that time instant $t_i$ (step 920), thereafter the main time-to-end estimation (i.e., the estimation of the time to the end of the drying cycle from the time instant $t_i$) is carried out based on an interpolation of the residual humidity estimation at that time instant $t_i$ and of the residual humidity estimations at a number of time instants preceding that time instant $t_i$ (step 935)—in other words, the interpolation takes place on a set of residual humidity estimations including the residual humidity estimation being performed at the time instant $t_i$ and a number of last residual humidity estimations being performed (at time instants) from the time instant $t_i$ backwards.

The set of residual humidity estimations to be considered for the interpolation is not limitative for the present invention, as it can be chosen according to specific design options. Just as an example, the set of residual humidity estimations considered for the interpolation comprises four residual humidity estimations. According to an embodiment of the present invention, when less than four residual humidity estimations are available at a (current) time instant $t_i$ (i.e., when less than three residual humidity estimations performed at the last three time instants immediately before the time instant $t_i$ are available in addition to the residual humidity estimation performed at that time instant $t_i$), steps 915 and 920 are repeated. This is represented in the figure by loop connection between exit branch N of decision step 925, indicating that the predetermined number of residual humidity estimations (including the residual humidity estimation at the time instant $t_i$) are not available, to the step 930, wherein the following time instant $t_{i+1}$ is considered, and to the step 915, wherein the operating signals at a following time instant $t_{i+1}$ are retrieved/received/determined (so as to be used for the following residual humidity estimation at step 920).

According to an alternative embodiment of the present invention, not shown, when no sufficient residual humidity estimations are available at the time instant $t_i$, a lower number of residual humidity estimations (for example, all the residual humidity estimations so far available) can be considered. Preferably, when only one residual humidity estimation is available at the time instant $t_i$, such as when the time instant $t_i$ is the first time instant from the start of the main phase of the drying cycle), the interpolation may be carried out on that residual humidity estimation and on an initial residual humidity estimation. This initial residual humidity estimation is advantageously derived from the initial time-to-end estimation, for example according to known relationships between the wetting degree of the load mass and the general duration of the current drying cycle.

The time interval between two subsequent time instants $t_i$, $t_{+1}$ may be statically set by the manufacturer according to specific design options, or caused to be dynamically determined during appliance operation. Just as an example, the time interval between two subsequent time instants $t_i$, $t_{+1}$ may be "modulated" (i.e., adjusted or kept in proper measure or proportion) according to the initial time-to-end estimation—e.g. the higher the initial time-to-end estimation, the higher the time interval between two subsequent time instants $t_i$, $t_{+1}$ (e.g., for the same number of time instants, and hence of residual humidity estimations, over the whole drying cycle).

As mentioned above, when the number of residual humidity estimations, e.g. four residual humidity estimations, are available (exit branch Y of decision step 925), the main time-to-end estimation is carried out based on an interpolation of these residual humidity estimations (step 935), thereafter, preferably, the main time-to-end estimation is reiterated during the main phase of the drying cycle (as better discussed below).

Advantageously, the interpolation of the residual humidity estimation results in a line (e.g., a straight line) from which interception with a predetermined or desired humidity level (for example, indicative of the residual humidity expected or desired at the end of the drying cycle) can be derived the main time-to-end estimation for the currently considered time instant More advantageously, the predetermined humidity level is selectable by a user (e.g., through the user interface 145).

According to the exemplary considered embodiment of the present invention, each residual humidity estimation at a given time instant $t_i$ is based on a linear regression model applied on at least one among (preferably, two or more) the above operating signals retrieved/received/determined at that time instant More preferably, each residual humidity estimation at a given time instant $t_i$ is obtained by a linear combination of at least one among (preferably, two or more) the above operating signals retrieved/received/determined at that time instant $t_i$. Even more preferably, each operating signal is weighted by a respective coefficient, the coefficient of each operating signal being for example calculated offline in a training phase of the model.

Advantageously, the coefficient of each operating signal is calculated by taking into account the load mass estimation; for example, different coefficients variants may be envisaged based on load mass classification, so as to adapt the main time-to-end estimation to the specific load mass. In any case, other load information may be provided additionally or alternatively to the load mass in order to train the model, so as to adapt the main time-to-end estimation also to other specific features of the load, or no load information can be used in alternative embodiments of the present invention.

As mentioned above, the main time-to-end estimation is preferably reiterated for a predefined number of iterations. Even more preferably, the time-to-end estimation is reiterated until the end of the drying cycle is detected, as conceptually represented in the activity diagram by loop connection between decision step 940 and step 915.

More specifically, after the main time-to-end estimation carried out at the time instant $t_i$, if the drying cycle has not yet ended (which condition could be detected by a comparison between the residual humidity estimation at that time instant $t_i$ and the desired humidity level indicative of the residual humidity expected or desired at the end of the drying cycle), exit branch N of decision step 940, the following time instant $t_{i+1}$ is considered and the estimation procedure 900 restarts from step 915, wherein the operating signals at the following time instant $t_{i+1}$ are retrieved/received/determined (so as to be used for the following residual humidity estimation at step 920).

As it was just mentioned, the residual humidity estimation at a currently considered time instant $t_i$ can advantageously be used for detecting the end of the drying cycle (also referred to as end cycle detection), for example according to a comparison between the residual humidity estimation at that time instant $t_i$ and the desired humidity level. Just as an example, if the residual humidity estimation at the time instant $t_i$ is lower than the desired humidity level (which comparison advantageously takes place at the main control circuitry 530), then the end of the drying cycle is detected. Additionally or alternatively, other conditions may be envisaged for detecting the end of the drying cycle; for example, if the residual humidity estimation at the time instant $t_i$ is higher than the desired humidity level by a predefined amount (for example, a predefined amount deemed negligible, or a predefined amount deemed compensable by residual hot air circulation during stopping of the drying cycle), then the drying cycle is considered ended.

In any case, the end cycle detection may also represent an aspect independent from, and alternative to, that of residual time-to-end estimation, of load mass estimation and of residual humidity estimation (in this respect, any advantageous feature discussed in connection with the end cycle detection in the context of load mass, residual humidity and time-to-end estimations also applies to the end cycle detection when being end in itself). In the latter case, end cycle detection may be carried out only based on monitoring of one or more of the operating signals (instead of being based on load mass estimation and/or residual humidity estimation), for example by setting one or more threshold values (e.g., each one associated with a respective operating signal) and detecting the end of the drying cycle when each operating signal (or at least a subset thereof) has reached the respective threshold value.

Similarly, although the residual humidity estimation has been discussed as preparatory or functional to end cycle detection and to time-to-end estimation, it may also represent an aspect independent from, and alternative to them (in this respect, any advantageous feature discussed in connection with the residual humidity estimation in the context of end cycle detection and of time-to-end estimation also applies to the residual humidity estimation when being end in itself). On the other side, although the main time-to-end estimation has been discussed as preferably based on residual humidity estimation, this should not be construed limitatively. Indeed, according to alternative embodiments of the present invention, the main time-to-end estimation is based only on monitoring one or more of the operating signals, for example by:

setting one or more threshold values (e.g., each one associated with a respective operating signal) such that when each operating signal (or a subset thereof) reaches the respective threshold value the end of the drying cycle is detected, monitoring a behavior of each operating signal (or of a subset thereof) over time with respect to the associated threshold value (i.e., monitoring the trend with which each operating signal approaches the respective threshold value), and estimating the residual time to the end of the drying cycle according to monitored behavior of each operating signal (or of a subset thereof). In other words, by knowing the threshold value(s) and the trend with which each operating signal approaches the respective threshold value, it is possible to estimate the residual time within which each operating signal is reasonably supposed to reach the respective threshold value (and hence the residual time-to-end of the drying cycle).

As should be readily understood, the estimation procedure 900 only shows possible ways the capacitive electric signal from the inventive humidity sensor 400 can be used to provide reliable residual time-to-end estimations (or, additionally or alternatively, load estimations and/or drying cycle detection). In any case, as briefly summarized here below, other approaches can be used, all of them being based on making use of the capacitive electric signal from the humidity sensor 400 (and, hence, falling within the scope of the present invention).

For example, the residual humidity at a given time instant $t_i$ may be based on direct relations between the capacitances in the drum. For example, according to a number of acquisitions of the capacitive electric signal, the capacitances within the drum and a relationship between the water mass and the capacitances within the drum may be determined (e.g., based on black-box or grey-box modelling using tools as parameter estimation and/or system identification), thereafter the residual humidity may be determined according to the ratio between the water mass and the load mass—possibly taking into account at least one among temperature inside and/or outside the drying chamber, and/or motor torque.

Another possible way could be to identify a model for evaporation of water in clothes as function of time, having as input variable the capacitive electric signal (and, possibly, any other signals from one or more sensing devices and/or control variables). This model might be a physical model considering the relation between capacitance and water in the drum, or a black-box or a gray-box model. An estimation of the end of the cycle then might be easily provided, for instance, by considering constant control variables for the rest of the drying cycle.

Alternatively, it could be inferred the evaporation rate during the process and, starting from considerations on the initial load conditions, a time-to-end estimation can be performed. An improvement to this method might be carried out, taking into consideration a combination of the evaporation rate to the drum temperatures behavior, or making use of the different characteristics of the motor torque during the cycle or a parallelism between load conductivity and capacity.

Naturally, in order to satisfy local and specific requirements, a person skilled in the art may apply to the invention described above many logical and/or physical modifications and alterations. More specifically, although the invention has been described with a certain degree of particularity with reference to preferred embodiments thereof, it should be understood that various omissions, substitutions and changes in the form and details as well as other embodiments are possible. In particular, different embodiments of the invention may even be practiced without the specific details (such as the numeric examples) set forth in the preceding description for providing a more thorough understanding thereof; on the contrary, well known features may have been omitted or simplified in order not to obscure the description with unnecessary particulars.

The invention claimed is:

1. An appliance comprising:
a cabinet;
a drying chamber located in the cabinet and configured to perform a drying cycle on a load of laundry contained in the drying chamber;
a capacitive sensing arrangement, attached to the cabinet and comprising a first capacitor element and a second capacitor element, the capacitive sensing arrangement being configured to generate an electric signal indicative of a dielectric value in an electric field extending between the first capacitor element and the second capacitor element and through the drying chamber; and
a control unit configured to receive the electric signal, and according to the electric signal, determine at least one time relating to an end of the drying cycle.

2. The appliance of claim 1, wherein the first capacitor element comprises at least one electrically conductive pad, and the second capacitor element comprises at least one electrically conductive track configured to convey a reference voltage generated by the control unit.

3. The appliance of claim 2, wherein the at least one electrically conductive track is integrated into a printed circuit board.

4. The appliance of claim 3, wherein the drying chamber is located between the at least one electrically conductive pad and the printed circuit board.

5. The appliance of claim 1, wherein the first capacitor element comprises a plurality of electrically conductive pads.

6. The appliance of claim 1, wherein the first capacitor element comprises at least a first conductive pad mounted on a first surface of an operating support, and at least one second conductive pad mounted on a second surface of the operating support, wherein the second surface is opposite the first surface.

7. The appliance of claim 1, wherein the dielectric value comprises a first component contributed by the load of laundry in the drying chamber, and one or more additional components contributed by other dielectric substances in the electric field.

8. The appliance of claim 1, wherein the dielectric value includes at least a first component contributed by the load of laundry in the drying chamber, and a second component contributed by air in the electric field.

9. The appliance of claim 8, further comprising a cover located over the first capacitor element, and within the electric field, and wherein the dielectric value includes a third component contributed by the cover.

10. The appliance of claim 1, wherein:
the cabinet comprises a loading opening at an open side of the drying chamber;
the appliance further comprises a door configured to selectively cover the open side of the drying chamber;

a portion of the drying chamber is defined by an interior wall surrounding the loading opening; and the first capacitor element is located at the interior wall below the loading opening.

11. The appliance of claim 10, further comprising an air opening located between the first capacitor element and the loading opening.

12. The appliance of claim 10, further comprising a cover separating the first capacitor element from contact with the load of laundry within the drying chamber.

13. The appliance of claim 1, wherein the at least one time relating to the end of the drying cycle comprises a determination that the drying cycle is complete.

14. The appliance of claim 1, wherein the at least one time relating to the end of the drying cycle comprises an estimate of time remaining until the drying cycle completes.

15. The appliance of claim 1, wherein the at least one time relating to the end of the drying cycle comprises at least:

a first estimate of a first time remaining until the drying cycle completes performed during a first operating time of the drying cycle; and a second estimate of a second time remaining until the drying cycle completes performed during a second operating time of the drying cycle.

16. The appliance of claim 1, wherein the at least one time relating to the end of the drying cycle comprises an interpolated value derived from:

a first residual humidity of the load of laundry derived from the electric signal at first operating time of the drying cycle; and a second residual humidity of the load of laundry derived from the electric signal at second operating time of the drying cycle.

17. The appliance of claim 1, wherein the control unit is configured to determine the at least one time relating to the end of the drying cycle based on a residual humidity of the load of laundry derived from the electric signal.

18. The appliance of claim 1, further comprising at least one temperature sensor configured to generate a temperature signal indicating a temperature of drying process air passing through the drying chamber.

19. The appliance of claim 18, wherein the control unit is further configured to receive the temperature signal and estimate the mass of the load of laundry based on the temperature signal.

20. The appliance of claim 18, wherein the control unit is configured to determine the at least one time relating to the end of the drying cycle based on a residual humidity of the load of laundry derived from the electric signal and the temperature signal.

* * * * *